US006497617B1

(12) United States Patent
Yoshida

(10) Patent No.: US 6,497,617 B1
(45) **Date of Patent: *Dec. 24, 2002**

(54) GAME MACHINE NOTIFYING FORMATION OF A SPECIFIC PRIZE MODE

(75) Inventor: Hiroshi Yoshida, Tokyo (JP)

(73) Assignee: Aruze Corporation, Tokyo (JP)

( * ) Notice: Subject to any disclaimer, the term of this patent is extended or adjusted under 35 U.S.C. 154(b) by 0 days.

This patent is subject to a terminal disclaimer.

(21) Appl. No.: 09/325,540

(22) Filed: Jun. 4, 1999

(30) Foreign Application Priority Data

Jun. 4, 1998 (JP) .......................................... 10-172177
Jun. 17, 1998 (JP) .......................................... 10-186855

(51) Int. Cl.[7] ................................................ A63F 13/00
(52) U.S. Cl. ....................... 463/20; 273/138.1; 273/274
(58) Field of Search .............................. 273/138.1, 139, 273/274; 463/20, 16

(56) References Cited

U.S. PATENT DOCUMENTS

| | | | | |
|---|---|---|---|---|
| 4,618,150 | A | * | 10/1986 | Kimura |
| 4,624,459 | A | | 11/1986 | Kaufman |
| 5,713,572 | A | | 2/1998 | Hagiwara |
| 5,803,451 | A | | 9/1998 | Kelly et al. |
| 6,270,408 | B1 | * | 8/2001 | Sakamoto et al. |
| 6,287,195 | B1 | * | 9/2001 | Sugimoto |
| 6,302,794 | B1 | * | 10/2001 | Ogawa |
| 6,306,034 | B1 | * | 10/2001 | Sakamoto et al. |

FOREIGN PATENT DOCUMENTS

| | | |
|---|---|---|
| DE | 38 30 648 | 3/1990 |
| DE | 195 42 625 | 11/1995 |
| EP | 0 391 667 | 10/1990 |
| EP | 0 414 427 | 2/1991 |
| EP | 0 720 129 | 7/1996 |
| EP | 0 875 870 | 11/1998 |
| EP | 0 918 307 | 5/1999 |
| EP | 0 921 504 | 6/1999 |
| GB | 2 057 738 | 4/1981 |
| GB | 2 117 155 | 10/1983 |
| GB | 2 147 442 | 5/1985 |
| GB | 2 326 260 | 12/1998 |
| JP | 62-127086 | 6/1987 |
| JP | 9-271559 | 10/1997 |
| JP | 9-309735 | 10/1997 |
| JP | 10-33750 | 2/1998 |
| JP | 10-305128 | 11/1998 |

* cited by examiner

*Primary Examiner*—Benjamin H. Layno
*Assistant Examiner*—V. Mendiratta
(74) *Attorney, Agent, or Firm*—Pillsbury Winthrop LLP

(57) ABSTRACT

In the conventional game machine, a player is mechanically informed of the result of the inner lottery, as it is, for causing the big hit prize and cannot enjoy the pleasure of searching the result of the inner lottery. Therefor in the present invention, a lighting control of the notification lamp 25 is carried out as follows. At first, eleven fixed patterns are referred to (at Step 301), and it is determined (at Step 302) what of the fixed patterns the pattern of the staging mode combination, in a series of flow of the game at this time, of the game starting sound, the reel lamp extinguishing pattern and the reel lamp flashing pattern coincides with. When no coincidence occurs, the routine is finished. When a coincidence occurs, it is then determined (at Step 303) whether or not the notification lamp 25 is being currently lighted. When the notification lamp 25 is not lighted, it is controlled to light by the lamp drive circuit 48 (at Step 304). When the notification lamp 25 is lighted, the routine is finished.

17 Claims, 37 Drawing Sheets

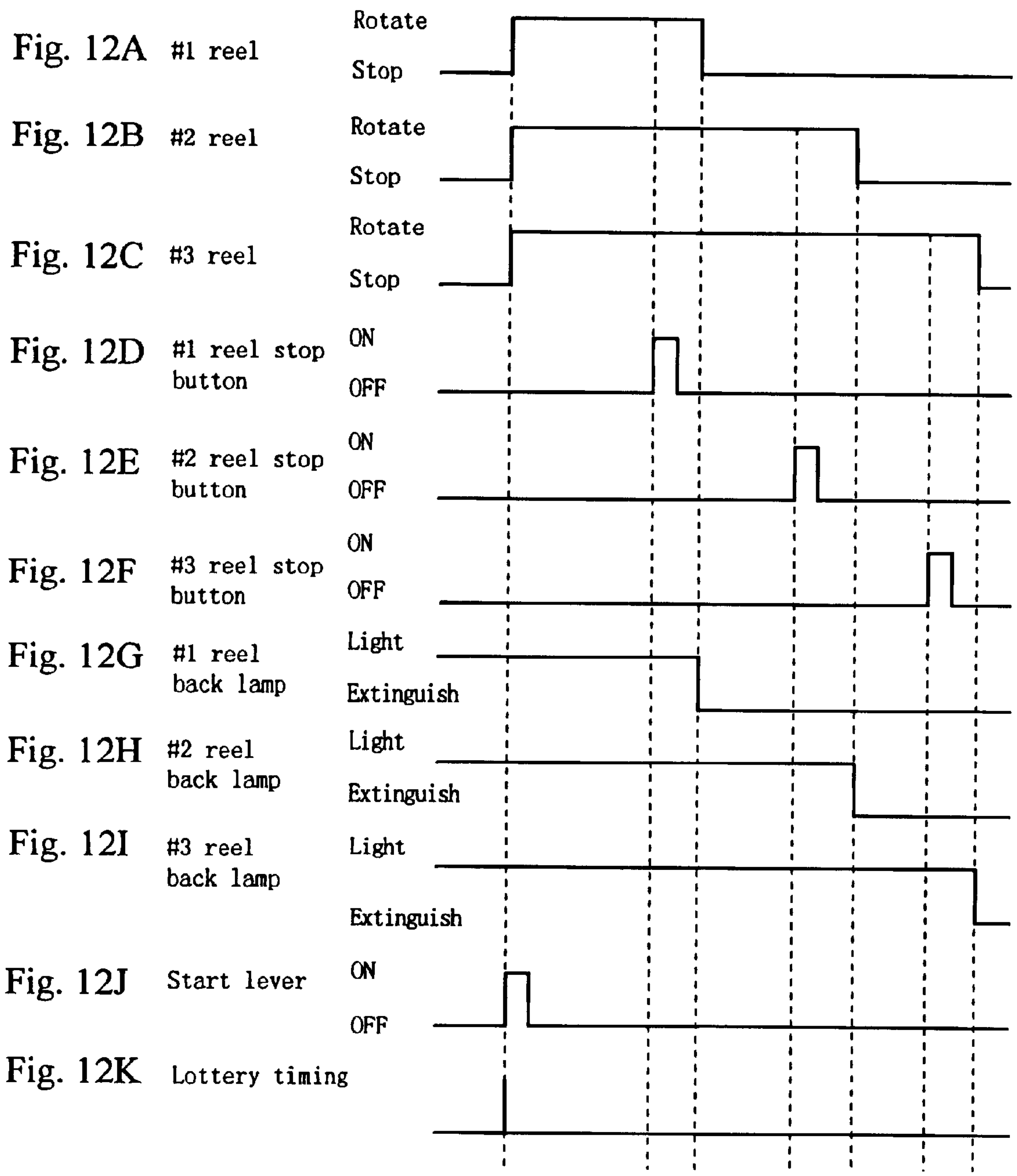
Fig. 12A #1 reel
Rotate
Stop
Fig. 12B #2 reel
Rotate
Stop
Fig. 12C #3 reel
Rotate
Stop
Fig. 12D #1 reel stop button
ON
OFF
Fig. 12E #2 reel stop button
ON
OFF
Fig. 12F #3 reel stop button
ON
OFF
Fig. 12G #1 reel back lamp
Light
Extinguish
Fig. 12H #2 reel back lamp
Light
Extinguish
Fig. 12I #3 reel back lamp
Light
Extinguish
Fig. 12J Start lever
ON
OFF
Fig. 12K Lottery timing

| Hit / No. of coins | Big | Medium | Small | | | | |
|---|---|---|---|---|---|---|---|
| | BB | RB | Water melon | Bell | 4 Cherry | 2 Cherry | Replay |
| 1 | a 1 | b 1 | c 1 | d 1 | e 1 | f 1 | g 1 |
| 2 | a 2 | b 2 | c 2 | d 2 | e 2 | f 2 | g 2 |
| 3 | a 3 | b 3 | c 3 | d 3 | e 3 | f 3 | g 3 |

Fig. 28

| Code No. | #1 reel | #2 reel | #3 reel |
|---|---|---|---|
| 0 | A | E | B |
| 1 | G | C | H |
| 2 | F | D | F |
| 3 | C | G | E |
| 4 | F | D | F |
| 5 | A | A | A |
| 6 | D | E | E |
| 7 | C | G | F |
| 8 | G | D | D |
| 9 | F | E | F |
| 10 | C | B | H |
| 11 | F | D | B |
| 12 | A | E | F |
| 13 | E | D | E |
| 14 | C | A | F |
| 15 | F | E | H |
| 16 | B | G | C |
| 17 | F | D | F |
| 18 | C | B | D |
| 19 | E | F | E |
| 20 | F | D | F |

Fig. 29

| GMLVSTS | FLGCTR | Table No. |
|---|---|---|
| in RB operation | Blank | 17 |
| | Hit | 17 |
| in BB operation | Blank | 17 |
| | 2 Cherry | 17 |
| | 4 Cherry | 17 |
| | Bell | 17 |
| | Watermelon | 17 |
| | Replay | 17 |
| in General game | Blank | 0 |
| | 2 Cherry | 1 |
| | 4 Cherry | 2 |
| | Bell | 3 |
| | Watermelon | 4 |
| | Replay | 5 |
| | RB | 6 |
| | BB | 7 |
| in inner hit of RB | Blank | 8 |
| | 2 Cherry | 9 |
| | 4 Cherry | 10 |
| | Bell | 11 |
| | Watermelon | 12 |
| | Replay | 13 |
| in inner hit of BB | Blank | 14 |
| | 2 Cherry | 9 |
| | 4 Cherry | 15 |
| | Bell | 11 |
| | Watermelon | 16 |
| | Replay | 13 |

Fig. 30

| Table No. | Lottery value | Game starting sound | Reel lamp extinguish | Reel lamp flash |
|---|---|---|---|---|
| No. 0 | 100 | 1 | No | No |
| | 9 | 1 | 1 | No |
| | 8 | 1 | 2 | No |
| | 3 | 1 | 3 | 4 |
| | 8 | 2 | 3 | 9 |
| No. 1 | 93 | 1 | No | No |
| | 26 | 1 | 2 | No |
| | 4 | 1 | 3 | 6 |
| | 5 | 2 | No | No |
| No. 2 | 3 | 1 | No | 1 |
| | 10 | 1 | No | 3 |
| | 5 | 1 | 1 | 2 |
| | 49 | 1 | 3 | 5 |
| | 30 | 1 | 3 | 7 |
| | 1 | 1 | 3 | 9 |
| | 30 | 2 | 3 | 4 |
| No. 3 | 70 | 1 | No | No |
| | 18 | 1 | No | 2 |
| | 30 | 1 | 1 | No |
| | 2 | 1 | 1 | 2 |
| | 8 | 1 | 2 | No |
| No. 4 | 60 | 1 | No | 3 |
| | 42 | 1 | 3 | 4 |
| | 14 | 1 | 3 | 6 |
| | 12 | 1 | 3 | 8 |
| No. 5 | 97 | 1 | No | 1 |
| | 18 | 1 | 1 | 1 |
| | 8 | 1 | 2 | 1 |
| | 3 | 1 | 3 | 6 |
| | 2 | 1 | 3 | 8 |
| No. 6 | 36 | 1 | No | No |
| | 26 | 1 | No | 3 |
| | 20 | 1 | 3 | 5 |
| | 10 | 1 | 3 | 7 |
| | 18 | 2 | No | No |
| | 7 | 2 | 3 | 5 |
| | 7 | 2 | 3 | 7 |
| | 4 | 2 | 3 | 9 |

Fig. 31

| | | | | |
|---|---|---|---|---|
| No. 7 | 55 | 1 | No | No |
| | 9 | 1 | 3 | 5 |
| | 12 | 1 | 3 | 7 |
| | 22 | 2 | No | No |
| | 6 | 2 | 3 | 5 |
| | 6 | 2 | 3 | 7 |
| | 18 | 2 | 3 | 9 |

| | | | | |
|---|---|---|---|---|
| No. 8 | 77 | 1 | No | No |
| | 6 | 1 | 1 | 8 |
| | 16 | 1 | 3 | 6 |
| | 16 | 1 | 3 | 8 |
| | 10 | 2 | 3 | 6 |
| | 3 | 2 | 3 | 8 |

| | | | | |
|---|---|---|---|---|
| No. 9 | 40 | 1 | No | No |
| | 20 | 1 | 1 | 1 |
| | 13 | 1 | 3 | 3 |
| | 36 | 2 | No | No |
| | 10 | 2 | 1 | 2 |
| | 9 | 2 | 3 | 6 |

| | | | | |
|---|---|---|---|---|
| No. 10 | 10 | 1 | 3 | 4 |
| | 50 | 1 | 3 | 5 |
| | 68 | 2 | 2 | No |

| | | | | |
|---|---|---|---|---|
| No. 11 | 38 | 1 | No | No |
| | 38 | 1 | No | 2 |
| | 24 | 1 | 1 | 2 |
| | 14 | 1 | 2 | 2 |
| | 7 | 2 | 3 | 6 |
| | 7 | 2 | 3 | 8 |

| | | | | |
|---|---|---|---|---|
| No. 12 | 37 | 1 | No | No |
| | 35 | 1 | No | 3 |
| | 28 | 1 | 3 | 3 |
| | 4 | 1 | 3 | 4 |
| | 14 | 1 | 3 | 8 |
| | 10 | 2 | 3 | 5 |

Fig. 32

| | | | | |
|---|---|---|---|---|
| No. 13 | 50 | 1 | No | No |
| | 8 | 1 | 1 | 1 |
| | 18 | 1 | 2 | 1 |
| | 14 | 1 | 3 | 6 |
| | 12 | 1 | 3 | 8 |
| | 16 | 2 | No | 1 |
| | 10 | 2 | 3 | 8 |

| | | | | |
|---|---|---|---|---|
| No. 14 | 80 | 1 | No | No |
| | 7 | 1 | 1 | 6 |
| | 15 | 1 | 3 | 6 |
| | 17 | 1 | 3 | 8 |
| | 2 | 2 | 3 | 6 |
| | 7 | 2 | 3 | 8 |

| | | | | |
|---|---|---|---|---|
| No. 15 | 42 | 1 | 3 | 7 |
| | 38 | 1 | 3 | 9 |
| | 48 | 2 | 2 | No |

| | | | | |
|---|---|---|---|---|
| No. 16 | 30 | 1 | No | 3 |
| | 32 | 1 | 3 | 3 |
| | 16 | 1 | 3 | 6 |
| | 2 | 1 | 3 | 9 |
| | 38 | 2 | No | No |
| | 10 | 2 | 3 | 7 |

| | | | | |
|---|---|---|---|---|
| No. 17 | 128 | 1 | No | No |

Fig. 33A

| GMLVSTS | | |
|---|---|---|
| Content | | Data |
| bit 7 | Not used | Normally 0 |
| 6 | | |
| 5 | | |
| 4 | in inner hit of BB | 0:off 1:on |
| 3 | in inner hit of RB | 0:off 1:on |
| 2 | in general game | 0:off 1:on |
| 1 | in BB operation | 0:off 1:on |
| 0 | in RB operation | 0:off 1:on |

Fig. 33B

| FLGCTR | |
|---|---|
| Content | Data |
| in blank | 0 0 H |
| in hit of 2 cherry | 0 1 H |
| in hit of 4 cherry | 0 2 H |
| in hit of bell | 0 3 H |
| in hit of watermelon | 0 4 H |
| in hit of replay | 0 5 H |
| in hit of RB | 0 6 H |
| in hit of BB | 0 7 H |

Fig. 34

| Fixed pattern | Game starting sound | Reel lamp extinguish | Reel lamp flash |
|---|---|---|---|
| 1 | 1 | 1 | 6 |
| 2 | 1 | 1 | 8 |
| 3 | 1 | 2 | 2 |
| 4 | 1 | 3 | 3 |
| 5 | 2 | No | 1 |
| 6 | 2 | 1 | 2 |
| 7 | 2 | 2 | No |
| 8 | 2 | 3 | 5 |
| 9 | 2 | 3 | 6 |
| 1 0 | 2 | 3 | 7 |
| 1 1 | 2 | 3 | 8 |

Fig. 40

| Code No. | Hit prediction flag | | | |
|---|---|---|---|---|
| | Big hit | Medium hit | Small hit | No prize |
| 0 | 0 | 0 | 0 | 1 |
| 1 | 0 | 1 | 0 | 0 |
| 2 | 0 | 1 | 0 | 0 |
| 3 | 0 | 0 | 0 | 1 |
| 4 | 0 | 0 | 0 | 1 |
| 5 | 1 | 0 | 1 | 0 |
| ⋮ | ⋮ | ⋮ | ⋮ | ⋮ |
| 20 | 0 | 0 | 0 | 1 |

Fig. 42A Notifying lamp
Fig. 42B "Fixed pattern" fixing BB or RB
Fig. 42C Inner hit of BB or RB
Fig. 42D Prize of BB or RB
Fig. 42E Pay by BB or RB prize
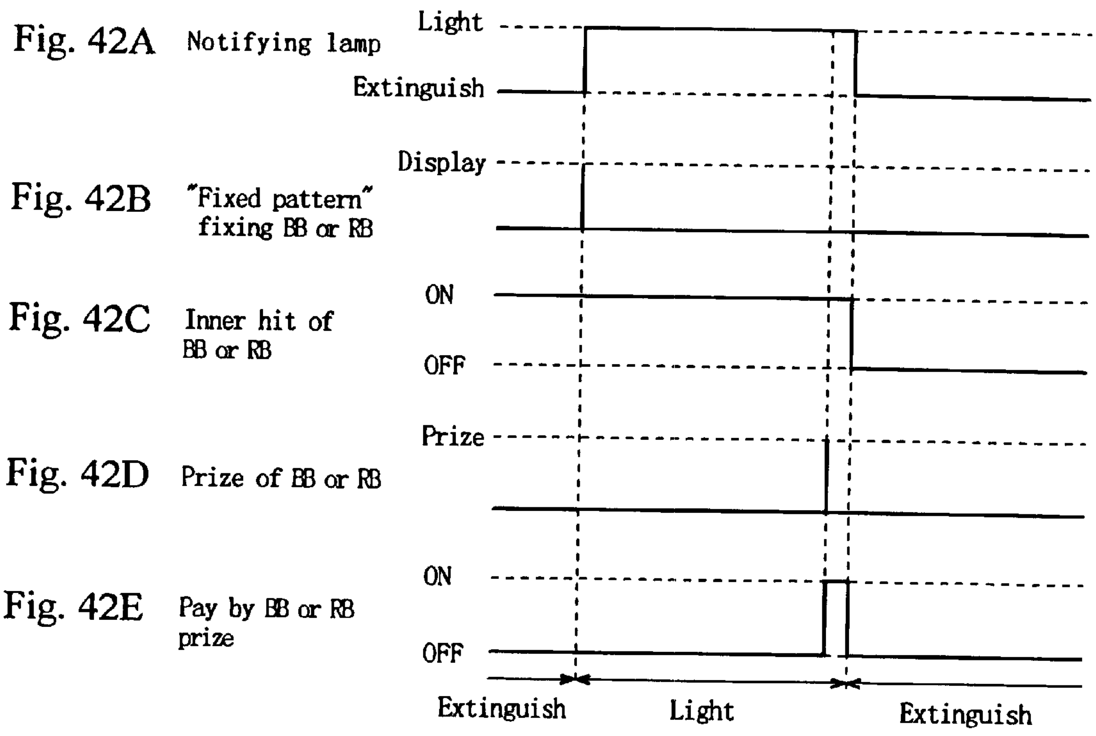

GAME MACHINE NOTIFYING FORMATION OF A SPECIFIC PRIZE MODE

This patent application claims priority based on the Japanese patent applications, H10-172177 filed on Jun. 4, 1998 and H10-186855 filed on Jun. 17, 1998 and the contents of which are incorporated herein by reference.

BACKGROUND OF THE INVENTION

1. Field of the Invention

The present invention relates to a game machine having a function to inform a player of a prize mode determined by a random number lottery.

2. Related Art

There has conventionally been, for example, a slot machine as a game machine of this kind. In a general slot machine, as shown in FIG. 1A, three reels 3, 4 and 5 are installed in parallel on the rear side of a front panel 2. Various patterns are illustrated on the outer circumferences of the individual reels 3 to 5, and the patterns are illuminated by built-in light sources (back lights), not shown, installed at the individual reels and are observed via individual windows 6, 7 and 8 formed at the front panel 2. Five prize lines are described in the windows, and the slot machine game is carried out depending upon whether or not a combination of predetermined patterns is set on any of the prize lines.

The game is started when a player puts a coin into a slit and when the coin is put into the slot, as shown in FIG. 1A, all of the back lights are lighted. When a coin of the player has not been put thereinto by the player for a predetermined time period after finishing the game, or the like, all of the back lights are extinguished, as shown in FIG. 1B. The individual reels 3 to 5 are rotated in response to the operation of a start lever by the player, and the individual windows 6 to 8 are displayed with the patterns which move to rotate in the directions of columns thereof. When the individual reels 3 to 5 reach a constant speed, the operation of the individual stop buttons installed in correspondence with the individual reels 3 to 5 becomes effective.

The player operates the individual stop buttons while observing the moving patterns and stops the rotation of the individual reels 3 to 5 thereby to stop and display desired patterns on any of the prize lines. The individual reels 3 to 5 stop rotating in response to the operational timings of the individual stop buttons. When a predetermined combination of patterns is displayed on any of the prize lines at the time of stopping them, a prize in response the combination of patterns is obtained.

There are a big hit prize, a medium hit prize, a small hit prize and so on in prize modes, and the big hit prize or the medium hit prize is caused when three of patterns "7" or patterns of a predetermined character are set on the prize line. A special game of big bonus game (BB game) in the case of the big hit prize or regular bonus game (RB game) in the case of the medium hit prize is carried out, and a large amount of coins can be acquired. Further, the small hit prize is caused when a predetermined number of patterns of "cherry" or "bell" are aligned on the prize line, and several coins can be acquired in the small hit prize. FIG. 1C shows a case in which patterns "bell" are aligned on a central prize line, and in this case, the back lights are flashed.

Such prize modes are determined by a lottery of random numbers which is carried out immediately after operating the start lever and has already been determined before the individual reels are operated to stop by the player. The lottery of random numbers is executed by prize mode determining means constituted inside of the game machine. When the big hit prize is determined by the lottery of random numbers, a display such as a notification lamp installed at the front panel of the machine is lighted, and the player is informed of the fact that the big hit prize is caused by the inner lottery of the machine. After this, the rotation of the individual reels is controlled to stop in response to the operation of stopping the buttons by the player, and the prize can be actually experienced by the player when a combination of patterns of the prize determined by the lottery of random numbers is stopped and displayed on the prize line.

In the aforementioned game machine of the prior art, however,when a big hit prize is caused by the inner lottery, the notification lamp immediately lighted, and the player is informed of a result of the inner lottery. According to the conventional game machine, therefore, the player is mechanically informed of the result of the inner lottery, as it is, for causing the big hit prize and cannot enjoy the pleasure of searching the result of the inner lottery as in, for example, searching for the "reach spot". Here, the "reach spot" means a predetermined combination of patterns which is displayed at the timing of stopping the rotation of the individual reels in the circumstance the big hit prize is caused by the inner lottery.

Furthermore, what is informed is only the case in which the big hit prize is caused by the inner lottery, and the information to be conveyed to the player is limited. Therefore, the result of the inner lottery which has been determined by the lottery of random numbers inside of the machine is not known until the patterns are actually stopped and displayed at the individual windows with regard to the prize modes other than big hit prize. Accordingly, the player cannot previously grasp the result of the inner lottery, and therefore, what patterns are to be aligned on the prize line cannot be known to the player at all when the rotation of the reels is operated to stop initially.

SUMMARY OF THE INVENTION

According to the invention, as conceived to address those problems, there is provided a game machine which comprises: prize mode determining means for determining a prize mode of a game by a random number lottery; a variable display device for displaying various patterns variably in a plurality of columns and for displaying a combination of the patterns stationarily in said individual columns in accordance with the prize mode which is determined by said prize mode determining means; variable display starting means for starting the variable display of said variable display device; information means for informing a player, at a predetermined probability, of an information corresponding to the prize mode determined by said prize mode determining means; and notification means for notifying to the player the information in a specific informing mode on a condition in which the information is a predetermined one corresponding to a specific prize mode determined by the prize mode determining means.

According to this construction, the prize mode determined by the inner lottery is informed to the player at a predetermined probability by the information means. This allows the player to predict the prize mode to a certain extent.

Furthermore, when a specified prize mode is informed as the predetermined one, the result of the inner lottery of causing the specific prize mode is notified to the player by the notification means. In respect of the specific prize mode, when it is informed through the information other than the predetermined one, the result of the inner lottery is not notified by the notification means. Therefore, the player can be informed of the result of the inner lottery causing the specific prize mode through the information informed by the information means even when the result of the inner lottery of causing the specific prize mode is not notified by the notification means. Therefore, the pleasure for searching the occurrence of the specific prize mode is felt in the game from the information of the information means.

Furthermore, according to another aspect of the present invention, the game machine further comprises variable display stopping means for stopping said variable display for the individual columns. And in this game machine, the information means informs the player, at a predetermined probability, of an information corresponding to the prize mode determined by said prize mode determining means, in a series of flow of the game from the start of said variable display by said variable display starting means to the end of one game stopped by stopping said variable display by said variable display stopping means, and the notification means notifies to the player the information by the specific informing mode on a condition in which the information by the information means is one corresponding to the specific prize mode determined by the prize mode determining means and the predetermined information informed to the player at a probability of 100%.

According to this construction, the prize mode determined by the inner lottery is informed to the player at a predetermined probability by the information corresponding to the prize mode through a series of flow of the game. This allows the player to predict the prize mode to a certain extent with the information mode according to the progress of the game.

Furthermore, when the specific prize mode is informed at the probability of 100%, the result of the inner lottery of causing the specific prize mode is notified to the player by the notification means. When the specific prize mode is informed at a probability smaller than 100%, that is, in case even when the specified prize mode is caused by the inner lottery, the specific prize mode may not necessarily be informed, the result of the inner lottery is not notified by the notification means. Therefore, the player can be informed of the result of the inner lottery causing the specific prize mode through the information informed through a series of flow of the game by the information means even when the result of the inner lottery of causing the specific prize mode is not notified by the notification means. Therefore, also in this case, the pleasure for searching the occurrence of the specific prize mode is felt in the game from the information of the information means.

BRIEF DESCRIPTION OF THE DRAWINGS

FIGS. 12A to 12K are timing charts illustrating individual circuit portions when the fourth interlocking display mode shown in FIG. 11 is executed;

Figure 23:
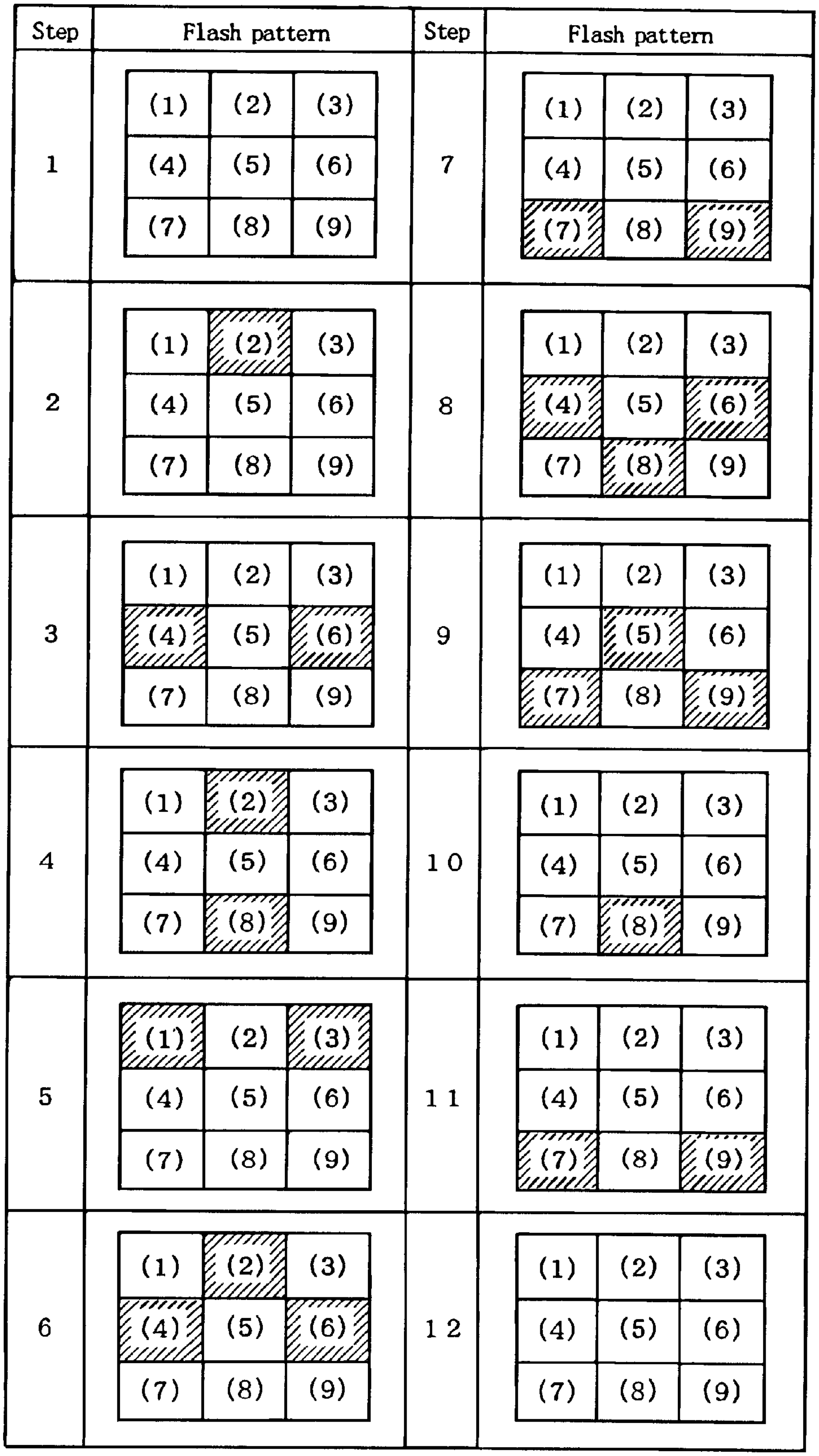
Figure 24:
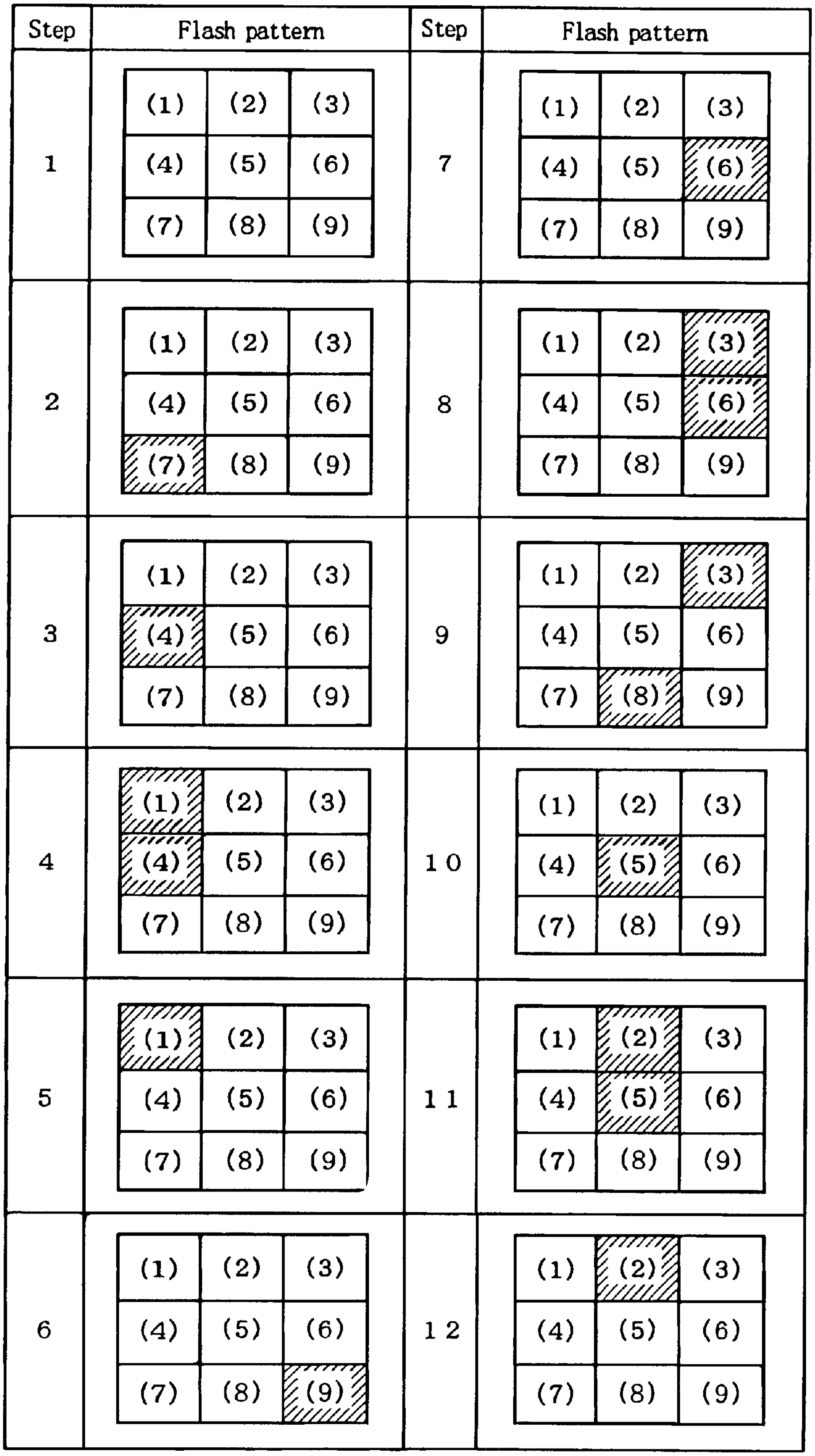
Figure 25:
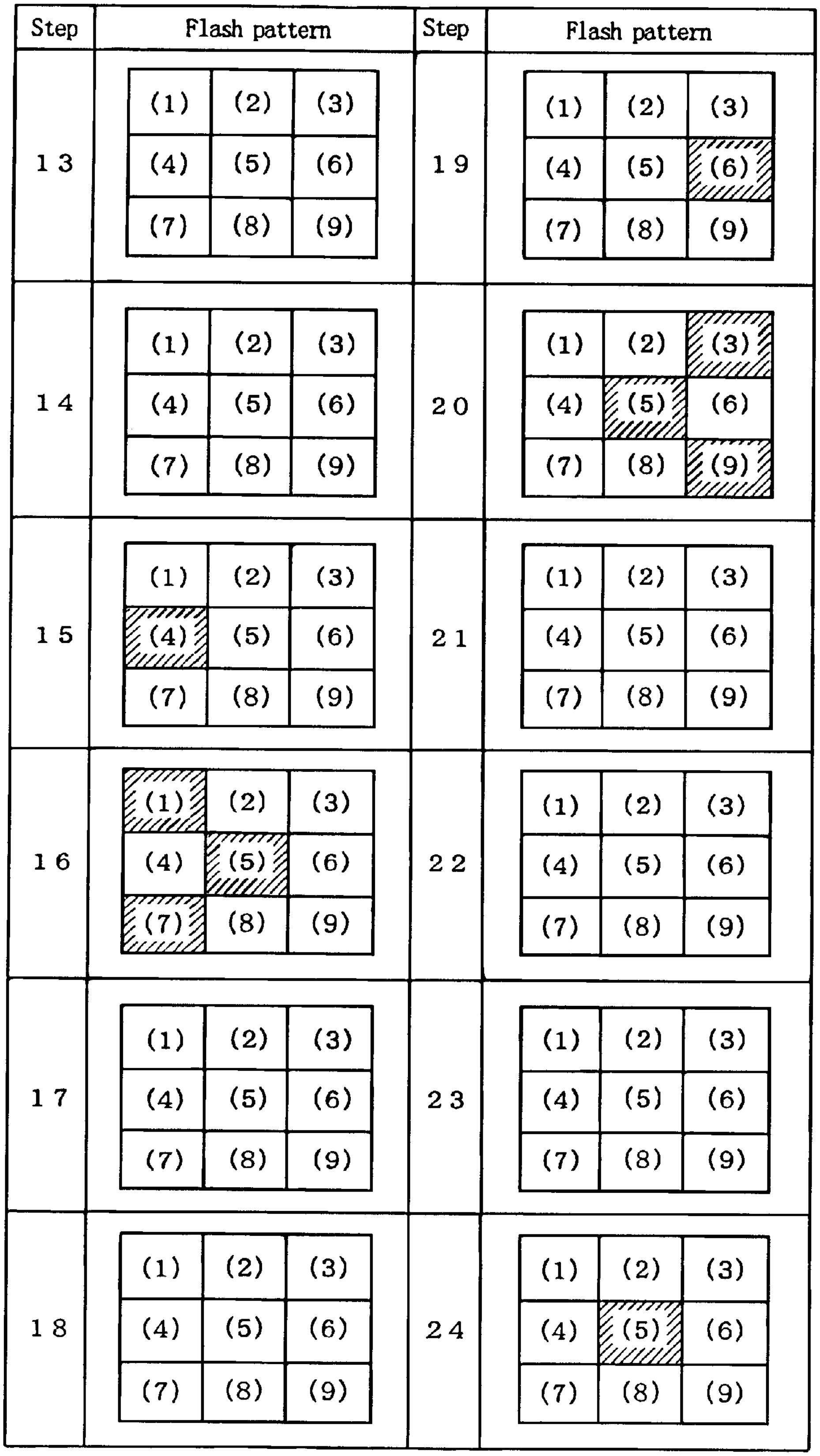
Figures 26, 27:
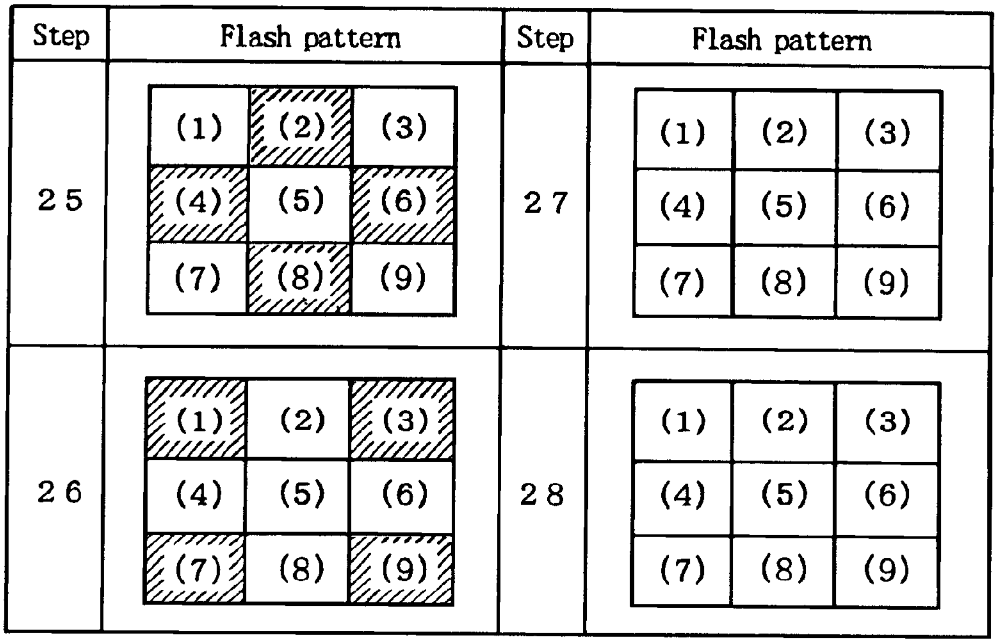
Figure 35:
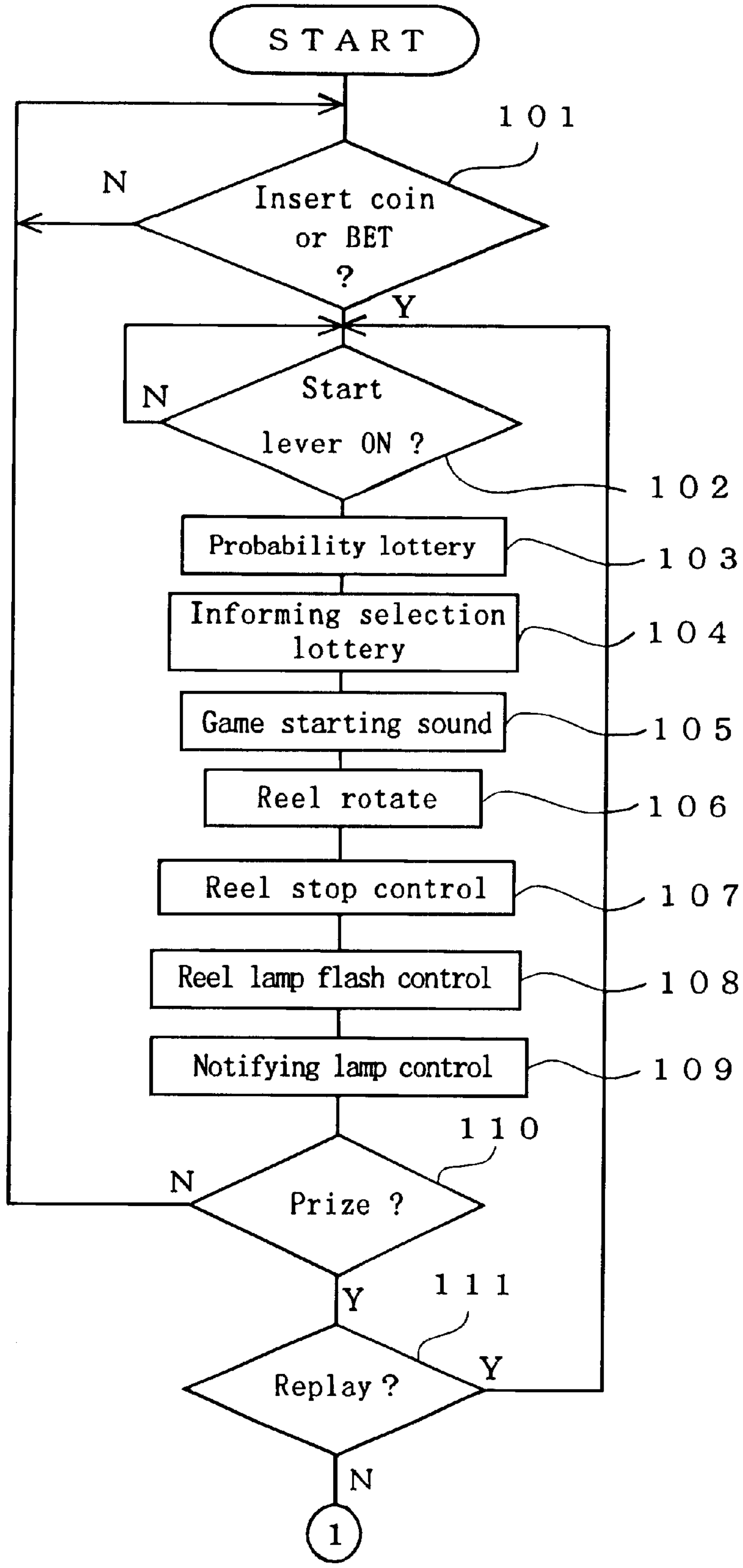
Figure 36:
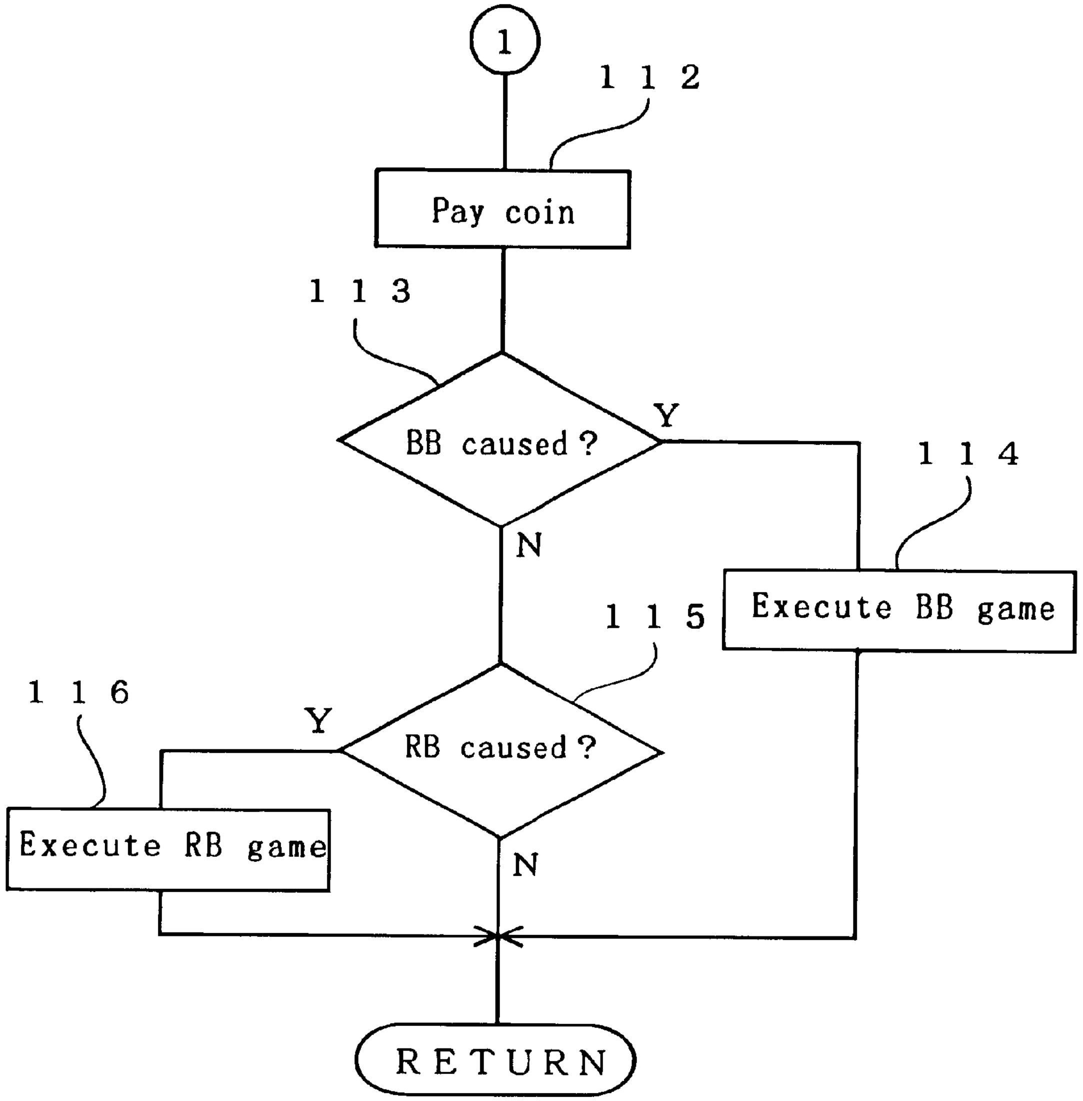
Figure 37:
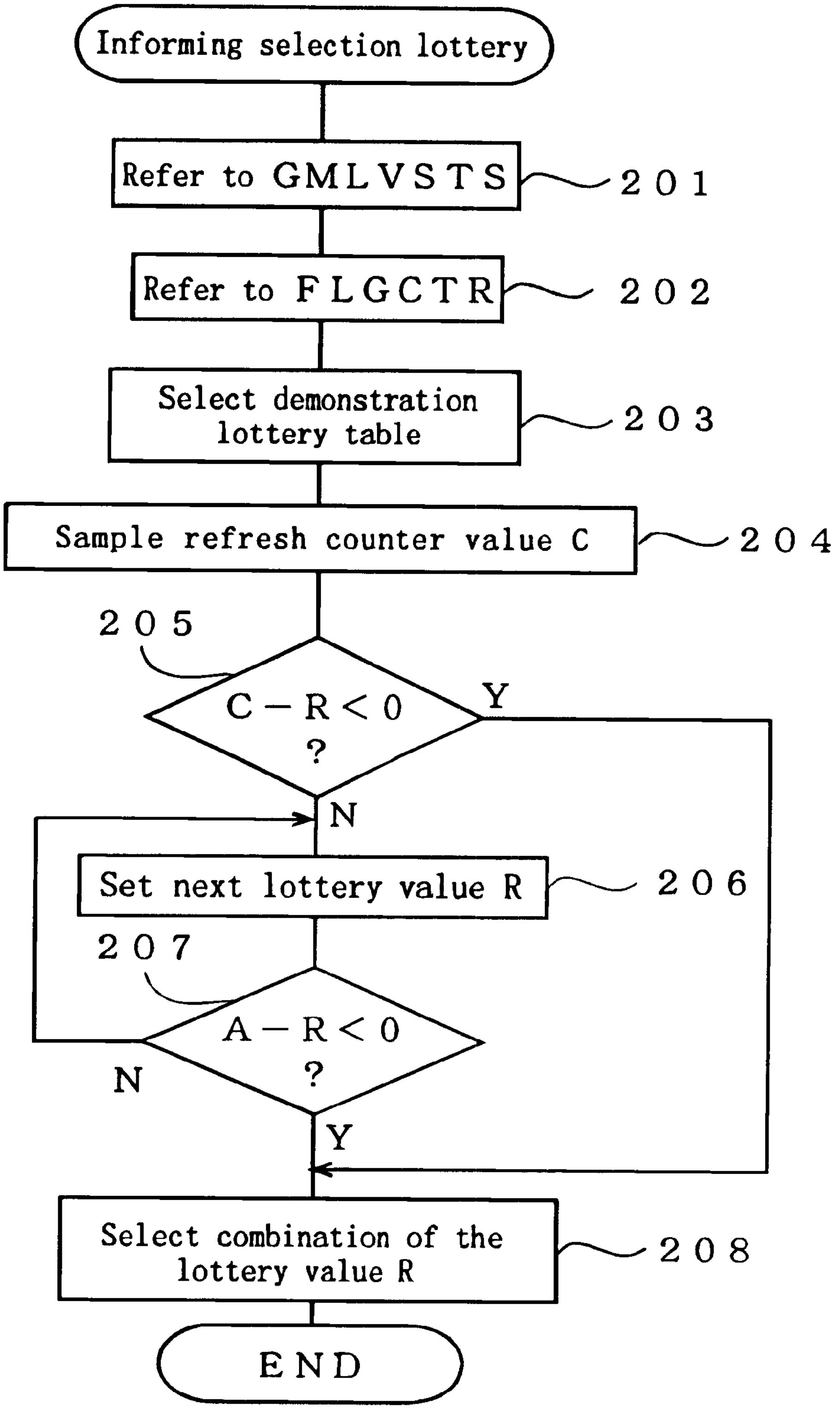
Figure 38:
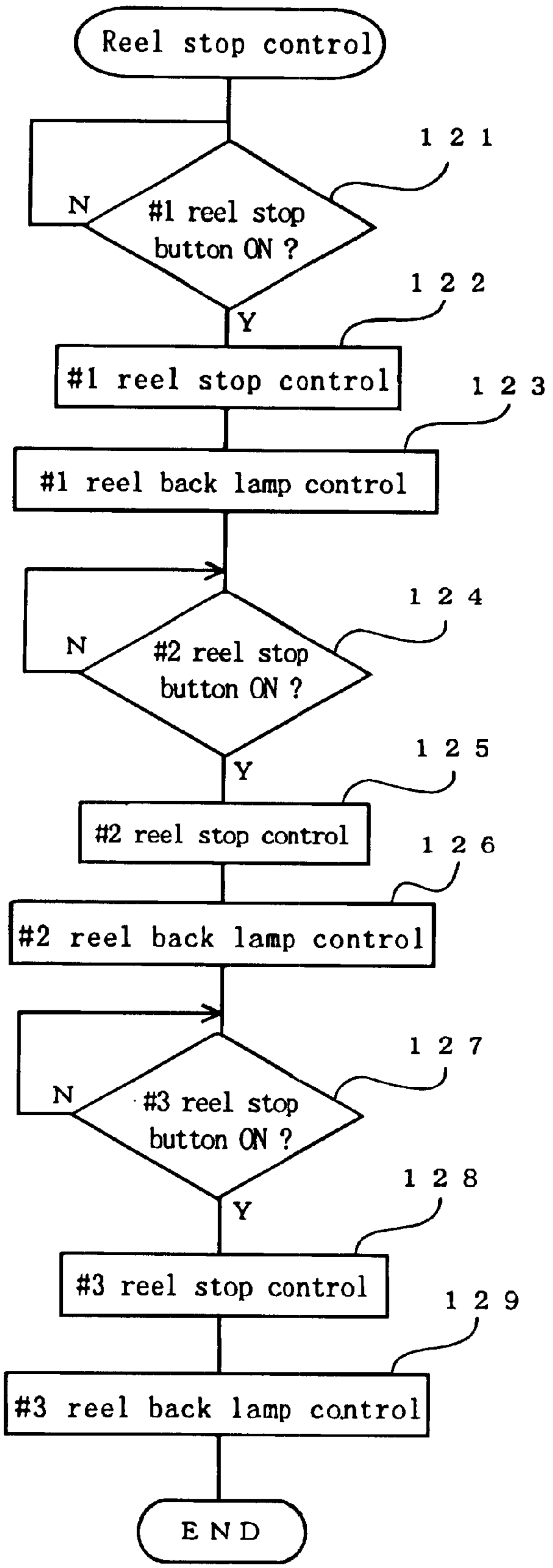
Figure 39A:
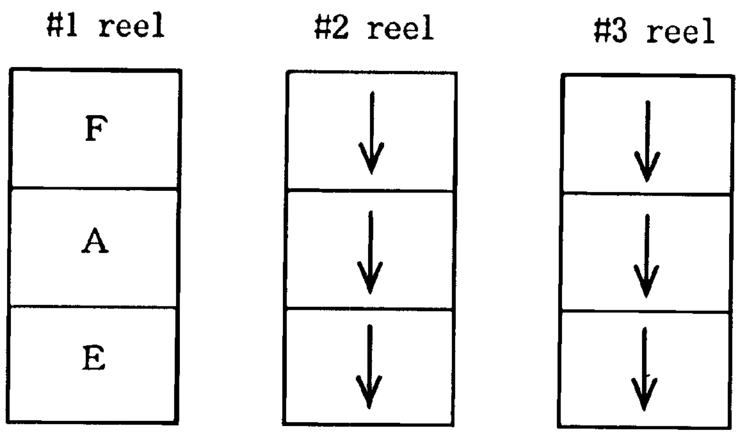
Figure 39B:
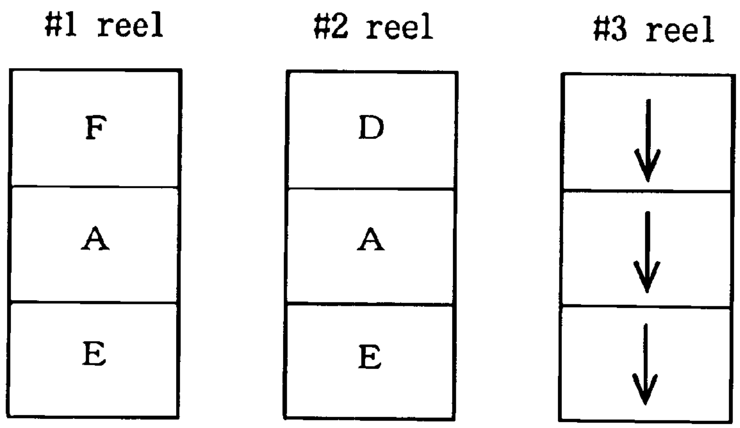
Figure 39C:
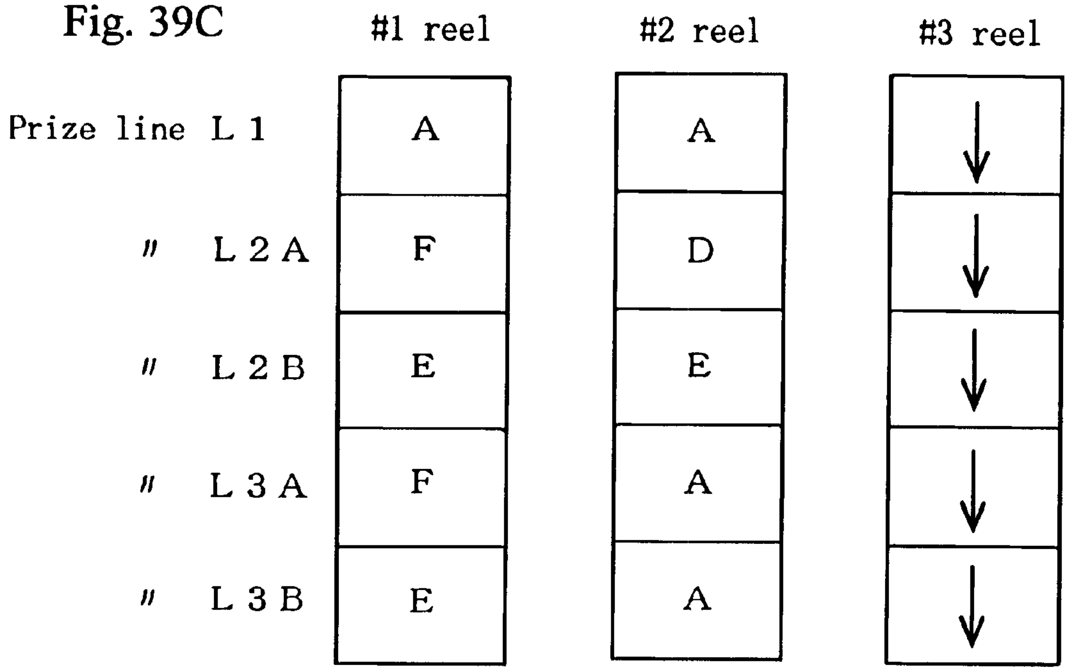
Figure 41:
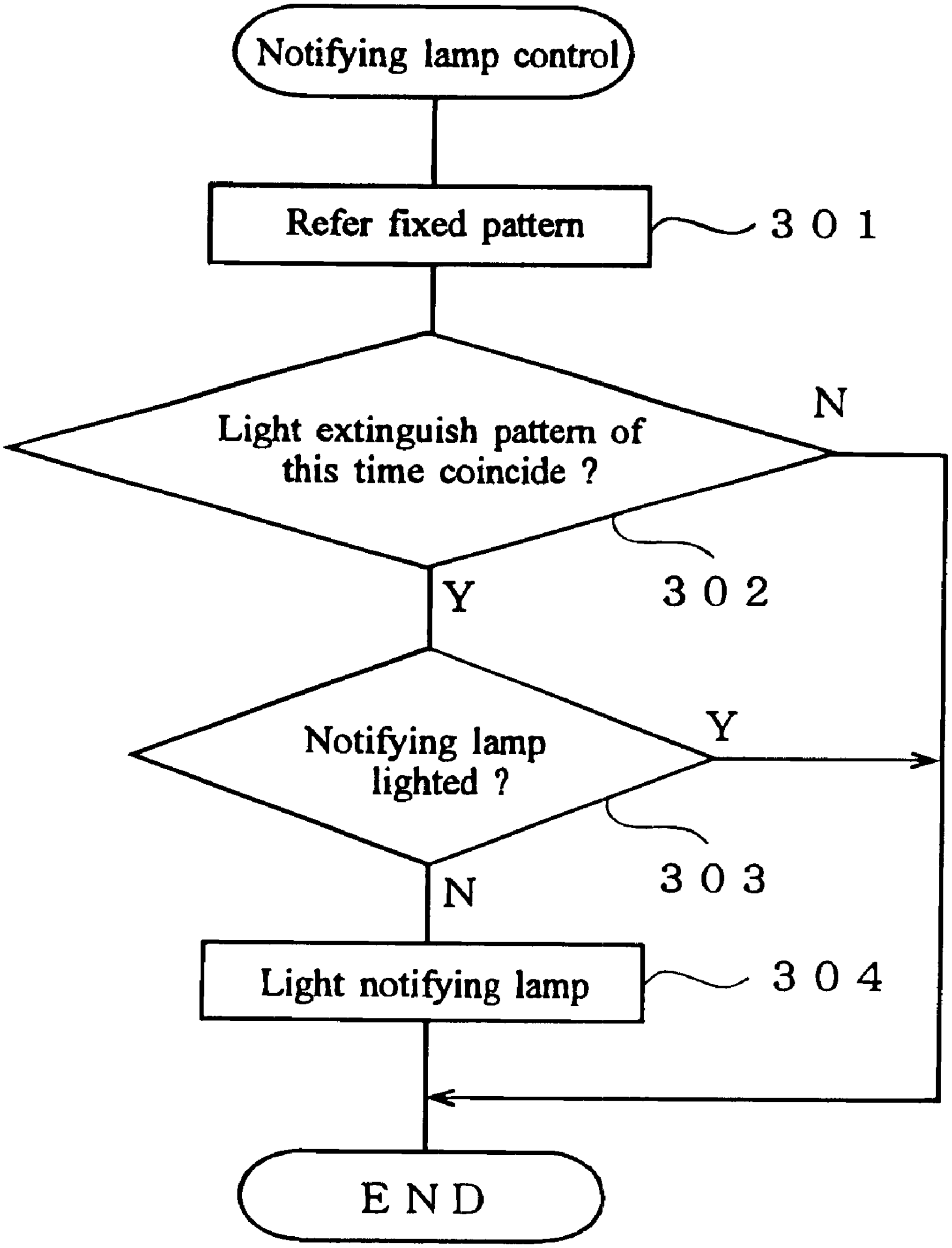

informed by the player by the stop staging means in the game process of the slot machine according to the embodiment;

FIG. 23 is a diagram illustrating a ninth stop display mode (or a reel lamp flashing pattern 8) informed by the player by the stop staging means in the game process of the slot machine according to the embodiment;

FIG. 24 is a diagram illustrating a front half of a tenth stop display mode (or a reel lamp flashing pattern 9) informed by the player by the stop staging means in the game process of the slot machine according to the embodiment;

FIG. 25 is a diagram illustrating an intermediate half of the tenth stop display mode (or the reel lamp flashing pattern 9) informed by the player by the stop staging means in the game process of the slot machine according to the embodiment;

FIG. 26 is a diagram illustrating a rear half of the tenth stop display mode (or the reel lamp flashing pattern 9) informed by the player by the stop staging means in the game process of the slot machine according to the embodiment;

FIG. 27 is a diagram showing a prize probability table used in the game process of the slot machines according to the embodiment;

FIG. 28 is a diagram showing a symbol table used in the game process of the slot machines according to the embodiment;

FIG. 29 is a diagram enumerating a demonstration lottery table selecting table used in the game process of the slot machine according to the embodiment;

FIG. 30 is a diagram enumerating a first demonstration lottery table used in the game process of the slot machine according to the embodiment;

FIG. 31 is a diagram enumerating a second demonstration lottery table used in the game process of the slot machine according to the embodiment;

FIG. 32 is a diagram enumerating a third demonstration lottery table used in the game process of the slot machine according to the embodiment;

FIG. 33A is a diagram enumerating a content of a game level status (GMLVSTS) storing region stored in the RAM of the slot machine according to the embodiment, and FIG. 33B is a diagram enumerating a content of a flag counter (FLGCTR) storing region stored in the RAM;

FIG. 34 is a diagram enumerating a probability pattern in which the prediction information of the occurrence of a specific prize mode is done at a probability of 100% in the embodiment;

FIG. 35 is a first flowchart showing a game process of the slot machine according to the embodiment;

FIG. 36 is a second flowchart showing the game process of the slot machine according to the embodiment;

FIG. 37 is a flowchart showing a content of an information selecting lottery process shown in FIG. 35;

FIG. 38 is a flowchart showing a content of a reel stop control process shown in FIG. 35;

FIGS. 39A to 39C are diagrams showing a relationship among symbol codes which are allocated to the individual rotating reels and read in the game process of the slot machine according to the embodiment;

FIG. 40 is a diagram enumerating a hit prediction flag table used in the game process of the slot machine according to the embodiment;

FIG. 41 is a flowchart showing a content of a notification lamp control process shown in FIG. 35;

FIGS. 42A to 42E are diagrams illustrating timing charts of lighting a notification lamp according to the embodiment;

DESCRIPTION OF THE PREFERRED EMBODIMENT

Next, an explanation will be given of one embodiment in which a game machine according to the invention is applied to a slot machine.

Figure 1A:
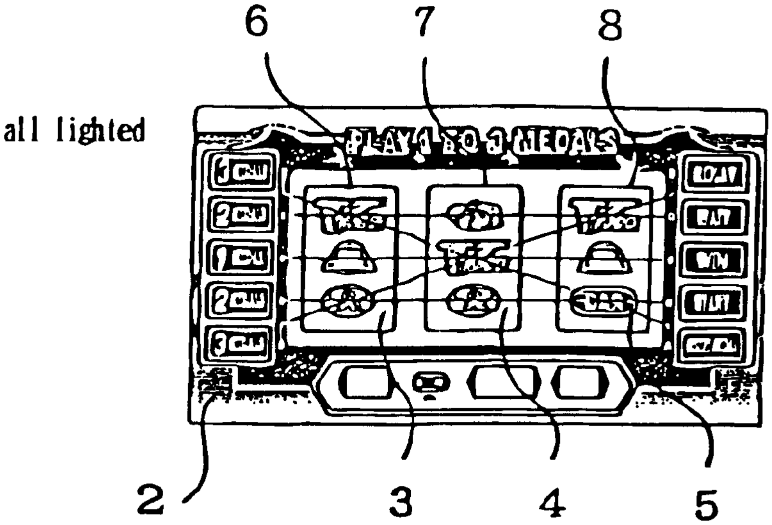
FIGS. 1A to 1C are views showing states of lighting individual reel back lamps in a conventional slot machine.
Figure 1B:
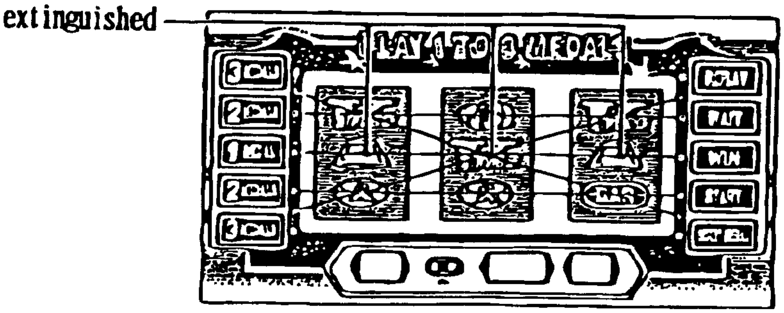
Figure 1C:
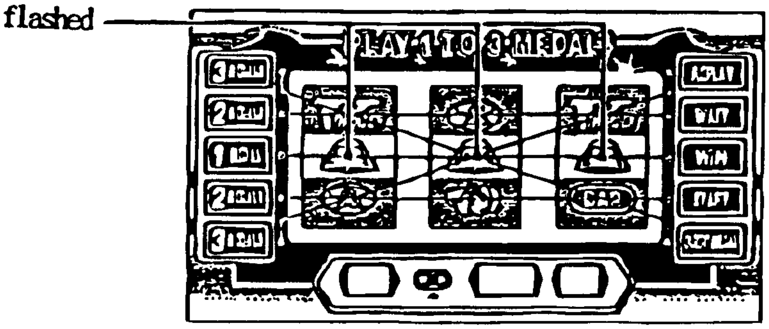
Figure 2:
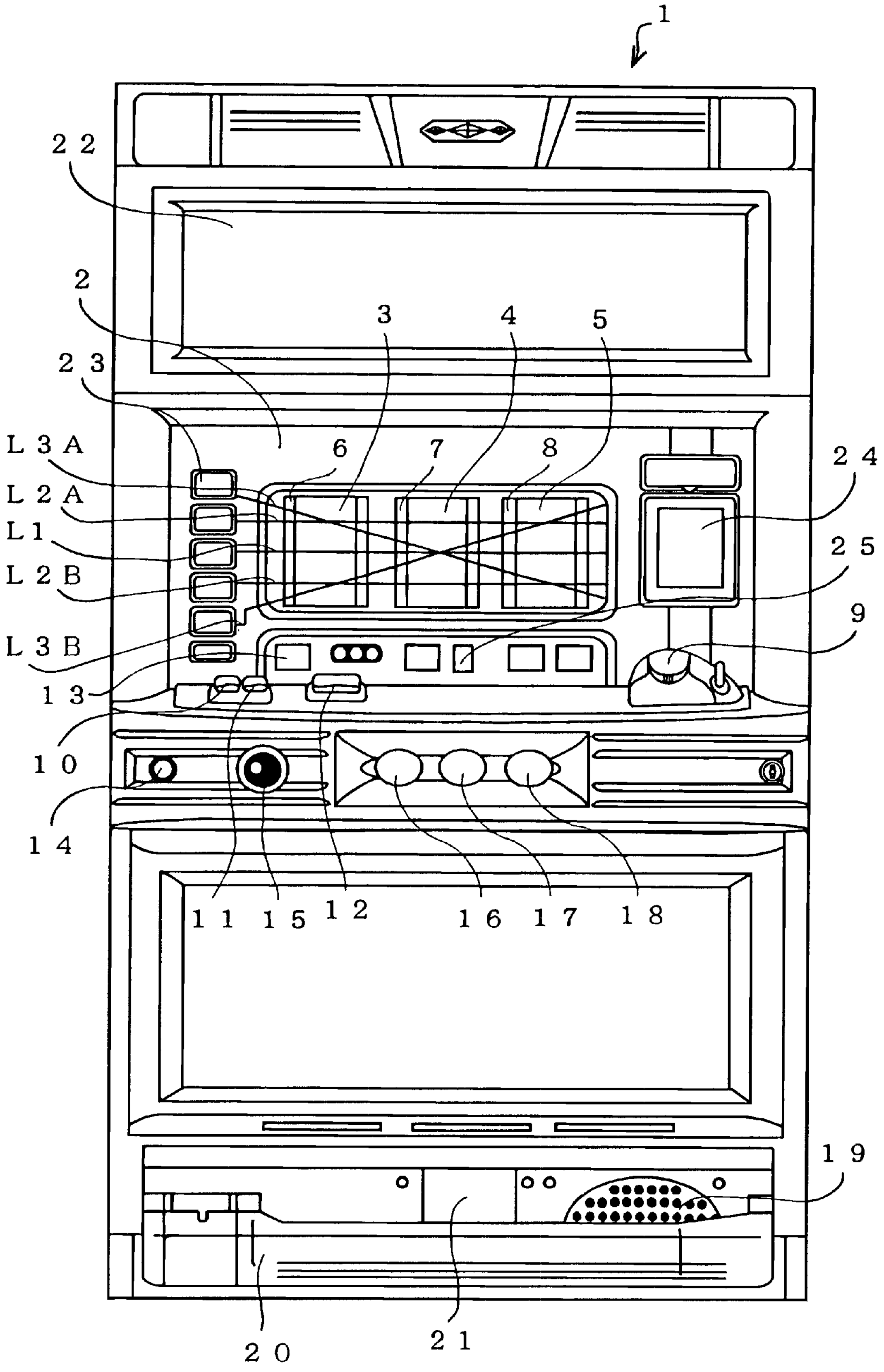
FIG. 2 is a front view showing an outlook of a slot machine according to one embodiment of the invention.

FIG. 2 is a front view of a slot machine 1 according to this embodiment.

Three reels 3, 4 and 5 constituting a variable display device are rotatably installed on the rear side of a front panel 2 of the slot machine 1. Columns of symbols comprising a plurality of kinds of patterns (hereinafter, referred to as the "symbols") are illustrated on the outer circumferences of the individual reels 3, 4 and 5. Three of the symbols are observed via each of display windows 6, 7 and 8 at the front face of the slot machine 1. Furthermore, a slot 9 into which a player inserts coins is installed on the lower right side of the display windows 6, 7 and 8.

Figure 3:
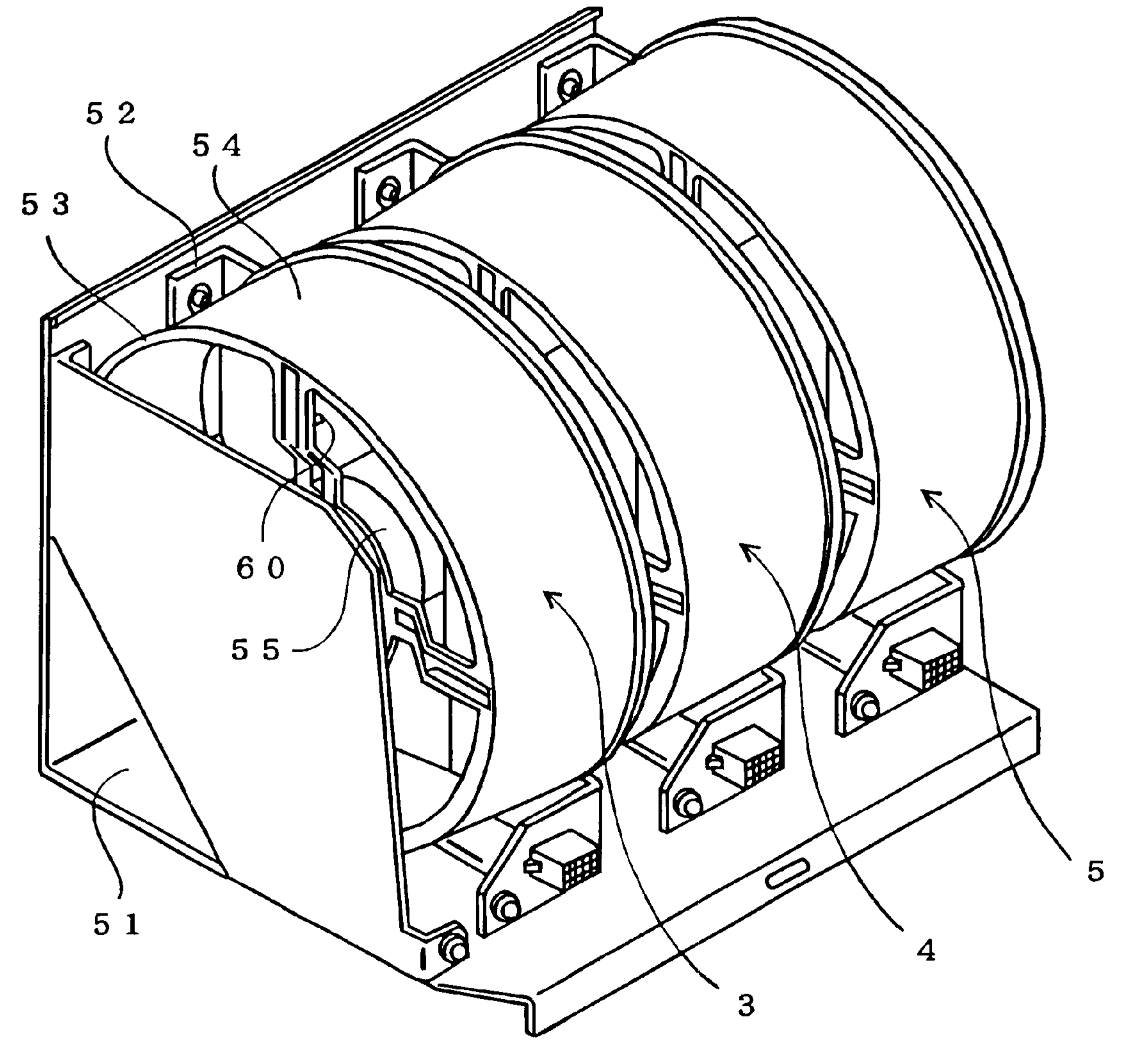
FIG. 3 is a perspective view showing a rotating reel unit of the slot machine shown in FIG. 2.

The individual reels 3 to 5 are constituted as a rotating reel unit shown in FIG. 3 and are attached to a frame 51 through brackets 52. Each of the reels 3 to 5 is constituted by pasting a reel band 54 on the outer circumference of a reel drum 53. The aforementioned symbol column on the outer circumference of the reel band 54. Furthermore, each of the brackets 52 is installed with a stepping motor 55, and the individual reels 3 to 5 are rotated by the drive of the motor 55.

Figure 4A:
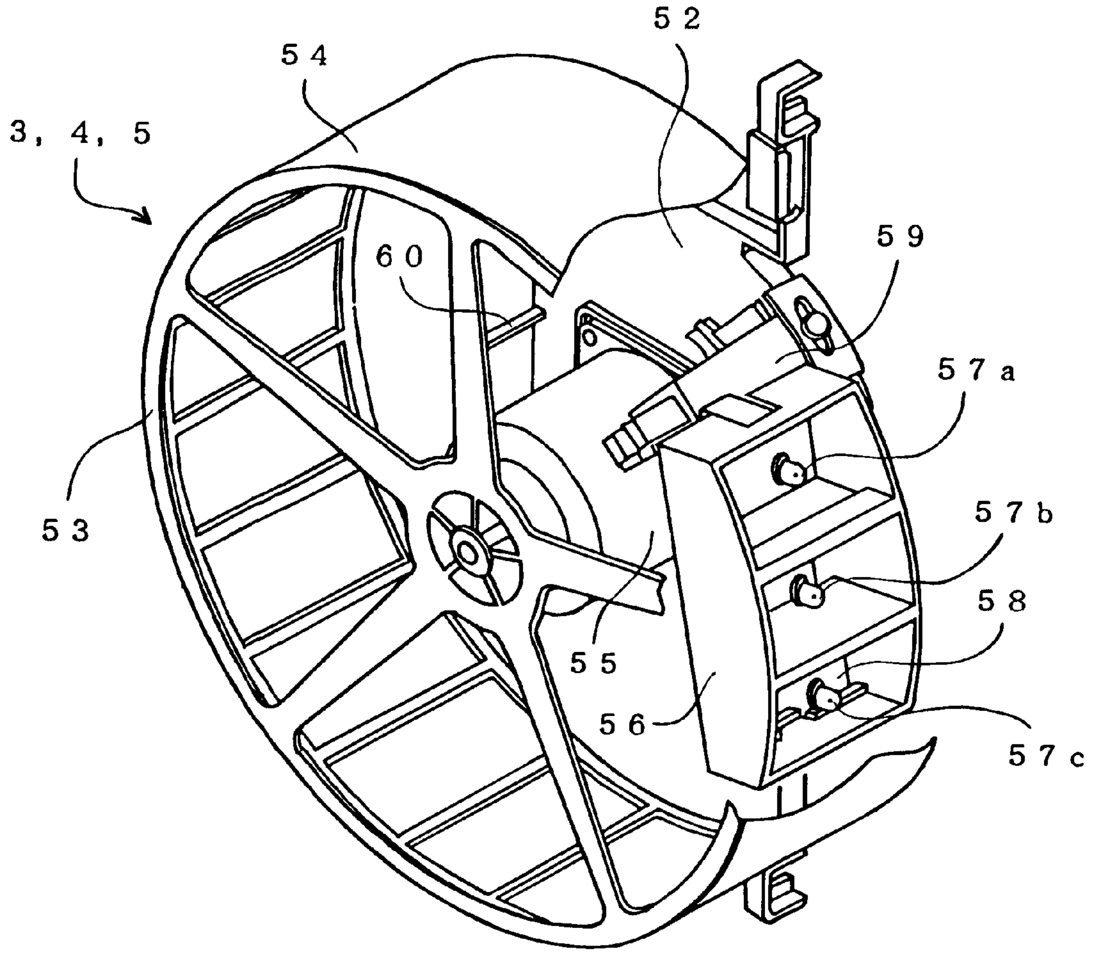
FIGS. 4A and 4B are perspective views showing a structure of a rotating reel constituting the rotating reel unit shown in FIG. 3.
Figure 4B:
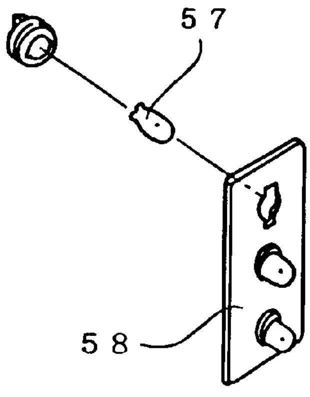

FIG. 4A shows the structure of each of the reels 3 to 5. Here, the same portions of FIG. 4A as those of FIG. 3 are designated by the same notations, and their explanation will be omitted. A lamp case 56 is installed inside of the reel drum 53 on the rear side of the reel band 54, and back lamps 57*a,* 57*b* and 57*c* are respectively attached to the three chambers of the lamp case 56. As shown in FIG. 4B, the back lamps 57*a,* 57*b* and 57*c* are mounted on a board 58, which is attached to the rear side of the lamp case 56. A photosensor 59 is attached to the bracket 52. The photosensor 59 detects a shield plate, as installed to the reel drum 53, to pass through the photosensor 59 as the reel drum 53 rotates.

The individual back lamps 57*a,* 57*b* and 57*c* are individually controlled and lighted by a later-described lamp drive circuit 48. By lighting the individual back lamps 57*a,* 57*b* and 57*c,* three symbols on the front side of the back lamps 57*a,* 57*b* and 57*c* are individually lighted from the rear side among symbols illustrated on the reel bands 54 so that they are projected on each of the display windows 6 to 8.

Figure 5A:
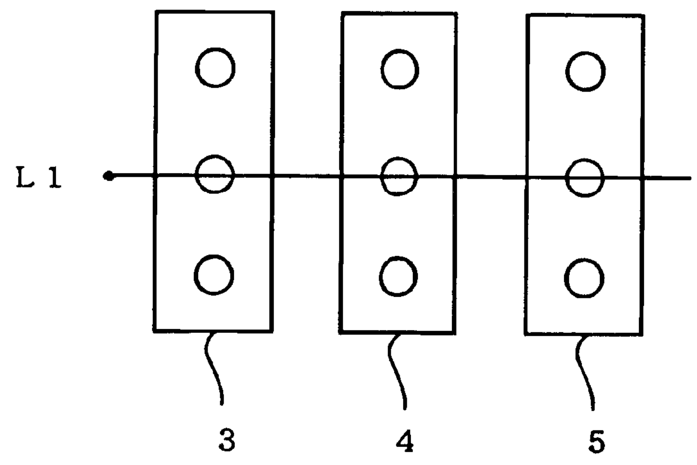
FIGS. 5A to 5C are views showing states in which prize lines described in display windows of the slot machine shown in FIG. 2 become successively effective.
Figure 5B:
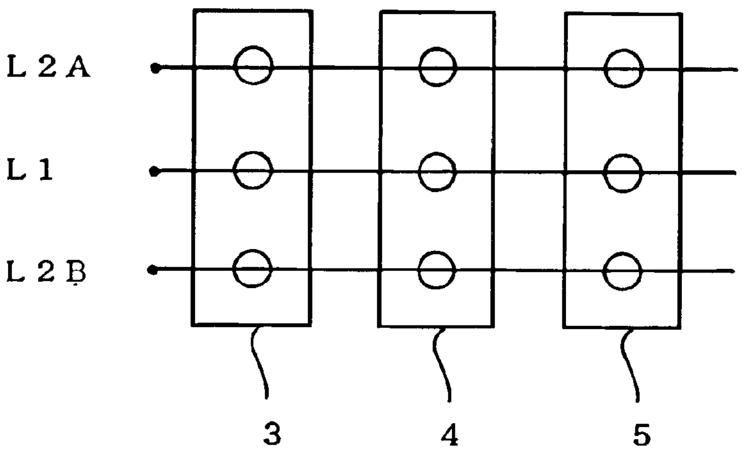

Furthermore, these display windows 6 to 8 shown in FIG. 2 are described with prize lines of horizontal three lines (including a central line L1, and upper and lower lines L2A and L2B) as well as two skew lines (including a skew right downward line L3A and a skew right upward line L3B). Before starting a game, when the player puts one coin into the coin slot 9, only the central prize line L1 of the individual reels 3 to 5 is made effective, as shown in FIG. 5A. When two coins are put into the slot 9, furthermore, the upper and lower prize lines L2A and L2B are added thereto so that the three horizontal lines of the prize lines L1, L2A and L2B are made effective, as shown in FIG. 5B. When three coins are put into the slot 9, furthermore, all the prize lines L1, L2A, L2B, L3A and L3B are made effective, as shown in FIG. 5C.

Figure 5C:
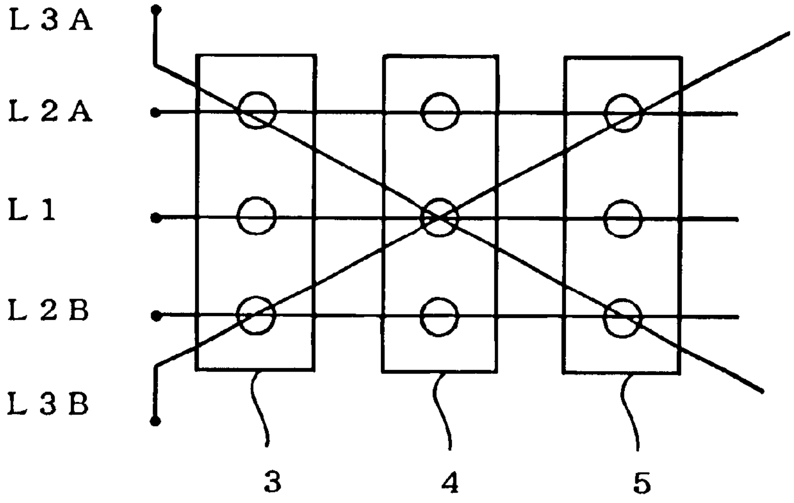

Here, circular marks in FIGS. 5A, 5B and 5C represent symbols illustrated on the respective reels 3 to 5. The effectiveness of the prize line is displayed to the player by lighting effective line display lamps 23 (as should be referred to FIG. 2) arranged at the end portions of the individual prize lines.

Furthermore, a 1BET switch 10, a 2BET switch 11 and a maxBET switch 12 are installed on the lower left side of the display windows 6 to 8. When coins are credited at a credit number display unit 13, instead of putting coins into the coin slot 9, by operating the individual push buttons of the 1BET switch 10, the 2BET switch 11 and the maxBET switch 12, one, two and three coins are individually bet in one game. The credit number display unit 13 is constructed by seven segments LEDs (Light Emitting Diodes) in accordance with the number of digits of a displayed numerical value, and displays the number of coins currently credited.

A credit/pay-out switch (C/P switch) 14 and a start lever 15 are installed on the lower side of the BET switches 10 to 12, and stop buttons 16, 17 and 18 are installed at a central portion of the device on the right side of the start lever 15. By operating the push button of the C/P switch 14, a play credit/pay-out can be switched.

The start lever 15 constitutes variable display starting means for starting the rotation display of the individual reels 3 to 5 so that the rotations of the reels 3, 4 and 5 are started altogether when the start lever 15 is operated. The stop buttons 16, 17 and 18 constitute variable display stopping means for stopping the rotation display of the individual reels 3, 4 and 5 for each column and are arranged to correspond to the reels 3, 4 and 5, respectively. When the rotation of the individual reels 3 to 5 reaches a constant speed, the operation of the individual stop buttons 16 to 18 is made effective to stop the rotation of the individual reels 3 to 5 in response to the pushing operation of the player.

Furthermore, a sound emitting hole 19 and a coin tray 20 are installed on the lower side of the front face of the slot machine 1. The sound emitting hole 19 is provided for emitting the sound, as generated from a speaker housed inside of the device, to the outside. The coin tray 20 is provided for storing the coins paid out from a coin outlet 21. Furthermore, a prize display portion 22 for indicating how many coins are to be paid out to each prize is installed on the upper side of the front face of the slot machine 1.

Furthermore, a liquid crystal display unit 24 is installed at the front panel 2 on the right side of the individual reels 3, 4 and 5. The liquid crystal display unit 24 is a display device for displaying the rotation of the individual reels 3, 4 and 5, displaying the history of a game or carrying out a representation in a bonus game. A notification lamp 25 is installed on the front panel 2 right under the individual reels 3, 4 and 5. The notification lamp 25 is lighted, when the inner hit flag of BB or RB game is erected so that a later-described predetermined condition is established, and notifies the player of the fact that the bonus game is hit by the lottery inside of the machine.

Figure 6:
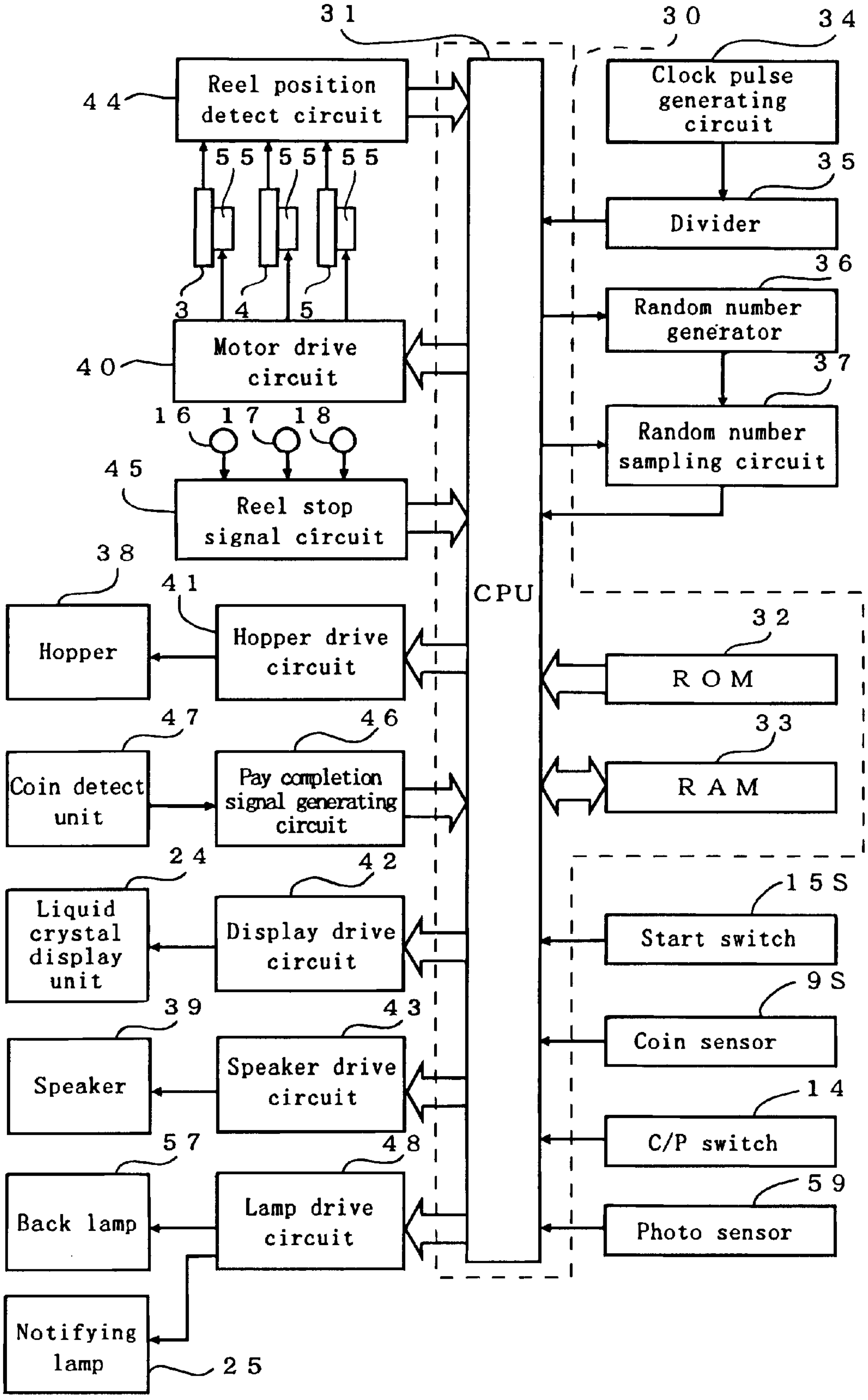
FIG. 6 is a block diagram showing a constitution of principal control circuits of the slot machine shown in FIG. 2.

FIG. 6 shows a circuit construction including a control unit for controlling the operation of a game process in the slot machine 1 of the embodiment, and peripheral devices (e.g., actuators) electrically connected with the control unit.

The control unit is constituted by a microcomputer (as will be referred to as the "micon") 30 as a major component, and additional circuits for random number sampling. The micon 30 is constituted to include a CPU 31, a ROM 32 and a RAM 33 as storage means. The CPU 31 is connected with a clock pulse generating circuit 34 and a divider 35 for generating reference clock pulses, a random number generator 36 acting as random number generating means for generating random numbers in a constant range, and a random number sampling circuit 37 acting as random number sampling means for sampling an arbitrary random number among the generated random numbers.

As major actuators to be operationally controlled with control signals coming from the micon 30, there are provided the stepping motor 55 for driving each of the reels 3, 4 and 5 to rotate, a hopper 38 for containing coins, the liquid crystal display unit 24, a speaker 39, the back lamps 57*a*, 57*b* and 57*c* and the notification lamp 25. These actuators are respectively driven by a motor drive circuit 40, a hopper drive circuit 41, a display drive circuit 42, a speaker drive circuit 43 and the lamp drive circuit 48. These drive circuits 40 to 43 and 48 are connected with the CPU 31 through an I/O port of the micon 30. The stepping motor 55 is excited in a 1 or 2 phase by the motor drive circuit 40 and is rotated by one turn when it is fed with a drive signal of 400 pulses.

As major input signal generating means for generating input signals necessary for forming the control signals by the micon 30, furthermore, there are provided a start switch 15S for detecting on operation of the start lever 15, a coin input sensor 9S for detecting a coin inserted through the coin inserting slot 9 and the aforementioned C/P switch 14. There are further provided the photosensor 59 and a reel position detecting circuit 44 for detecting the rotational positions of the individual reels 3, 4 and 5 in response to an output pulse signal coming from the photosensor 59.

The photosensor 59 detects the shield plate 60 at each rotation of the individual reels 3, 4 and 5 to generate a reset pulse. This preset pulse is transmitted to the CPU 31 through the reel position detecting circuit 44. The RAM 33 is stored with numerical values corresponding to the rotational positions in a range of one rotation in respect of the individual reels 3 to 5. In response to the reset pulse, the CPU 31 clears the numerical values, as established in the RAM 33, to "0". By this clearing action, a deviation, as caused between the display of movement of each symbol and the rotation of each stepping motor 55, is resolved at each rotation.

There are further provided a reel stop signal circuit 45 and a pay completion signal generating circuit 46 acting as the aforementioned input signal generating means. The reel stop signal circuit 45 generates signals for stopping the corresponding ones of the reels 3, 4 and 5 when the stop buttons 16, 17 and 18 are pushed. Furthermore, a coin detecting unit 47 counts the number of coins paid out from the hopper 38, and the pay completion signal generating circuit 46 outputs a signal for informing the completion of the pay-out of coins to the CPU 31 when the counted value of actually paid-out coins, as inputted from the coin detecting unit 47, reaches the data of a predetermined number of prizes.

The speaker 39, the speaker drive circuit 43 and the micon 30 constitute sound emitting means for generating either of two kinds of game starting sounds 1 and 2 as the effect sound when the rotation display of the individual reels 3 to 5 is started by the start lever 15. The kind of the game starting sound to be generated by the sound emitting means is selected according to the kind of the prize mode, as will be described hereinafter.

Figures 7A, 7B, 7C, 7D, 7E:
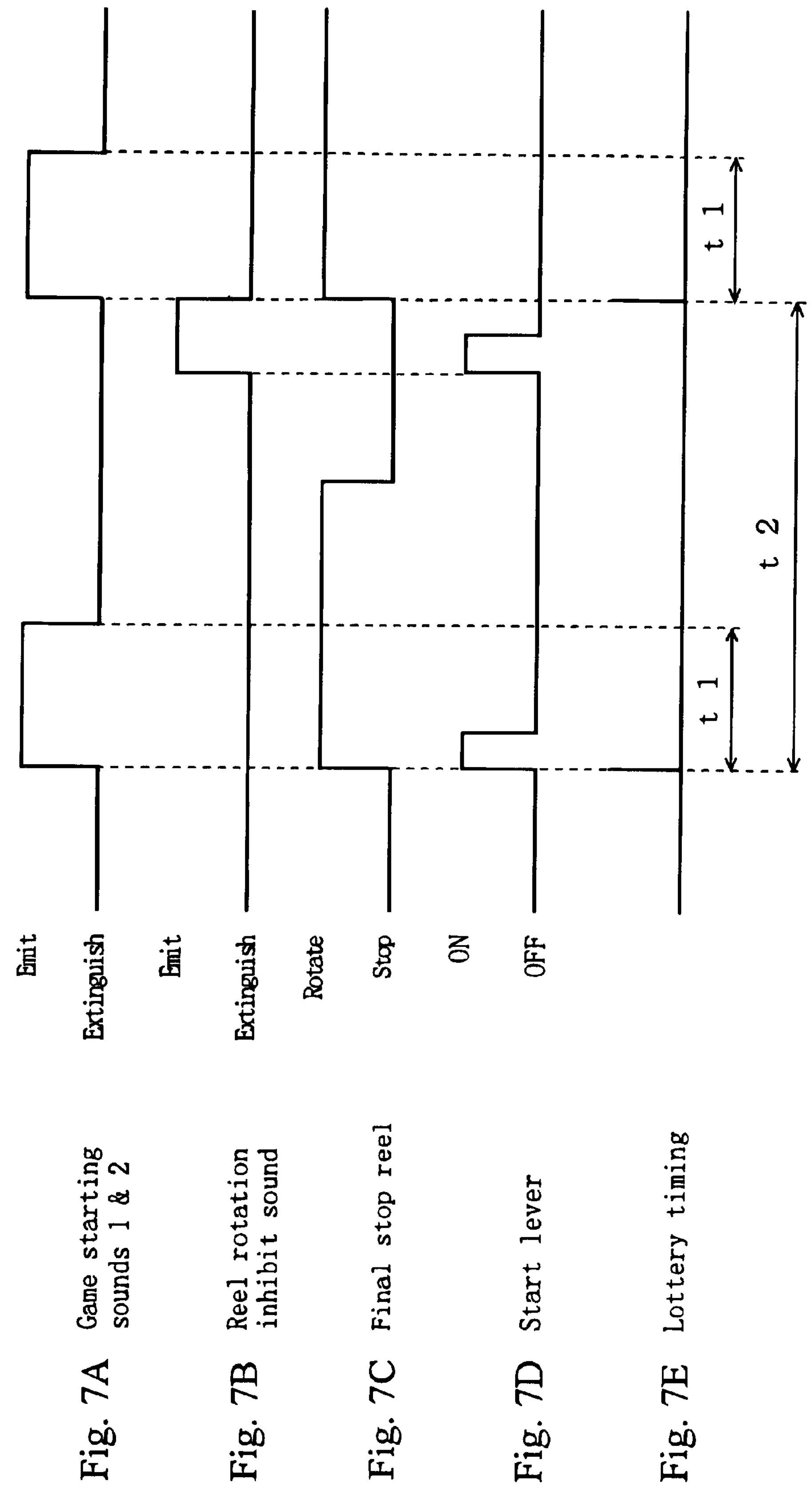
FIGS. 7A to 7E are timing charts illustrating the timings at which game starting sounds are outputted in a game process of the slot machine according to the embodiment.

The timing at which each game starting sound 1 or 2 is emitted is illustrated in FIG. 7A, and this sound is outputted for a duration t1 just after the prize mode lottery timing illustrated in FIG. 7E. The start lever 15 has to be operated at a time interval of t2, e.g.. 4.1 seconds so that the reel rotation inhibit sound is outputted at a timing, as illustrated in FIG. 7B, from the speaker 39 when a next lever operation is carried out within the time period t2 from the previous start lever operation, as illustrated in FIG. 7D. FIG. 7C illustrates the rotational state of the reel which will stop finally in the previous game.

Furthermore, the lamp drive circuit 48, the back lamps 57*a* to 57*c* and the micon 30 constitute connective staging means for staging the displays of the individual reels 3 to 5 successively in one of four kinds of display modes in connection with the stop of the rotational display of the individual reels 3 to 5 by the operation of the individual stop buttons 16 to 18. The display modes to be staged by this connective staging means are selected according to the kinds of the prize modes, as will be described hereinafter.

FIGS. 8, 9, 10 and 11 illustrate first, second, third and fourth display modes to be staged by the connective staging means. Here, the same portions of these Figures as those of FIG. 2 are designated by the same notations, and their description will be omitted.

Figure 8A:
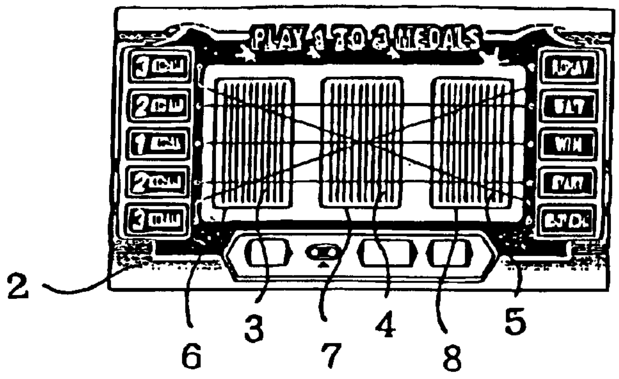
FIGS. 8A to 8D are diagrams showing a first interlocking display mode (no reel lamp extinguishment) to be informed to the player by the connective staging means in the game process of the slot machine according to the embodiment.
Figure 8B:
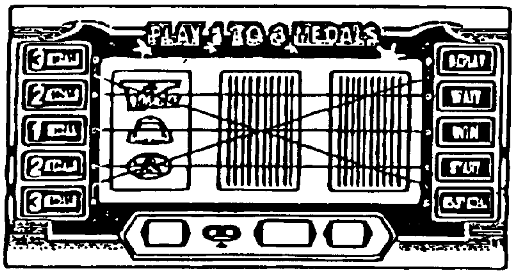
Figure 8C:
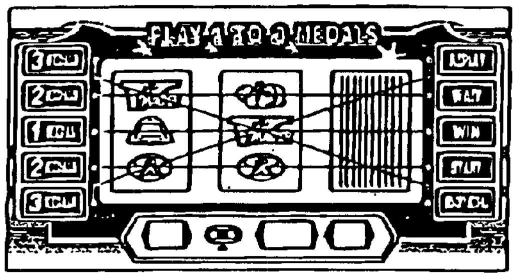
Figure 8D:
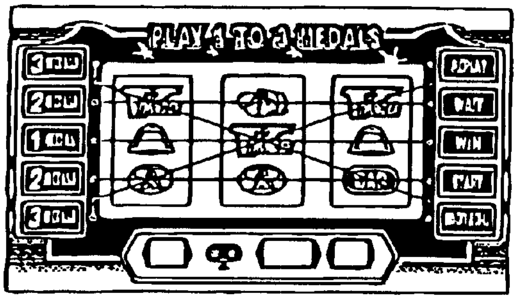

The first connective staging mode, as illustrated in FIGS. 8A to 8D, designates "no reel lamp extinguishment", in which the connective staging means lights all the back lamps 57*a* to 57*c* during the rotation of the individual reels 3 to 5, as illustrated in FIG. 8A. In case the first stop button 16 is operated to stop the rotation of the first reel 3, furthermore, the individual back lamps 57*a* to 57*c* of the first reel 3 are kept lighted, as illustrated in FIG. 8B. Likewise, in case the rotations of the second and third reels 4 and 5 are successively stopped by operating the second and third stop buttons 17 and 18, the individual back lamps 57*a* to 57*c* of the second and third reels 4 and 5 are also kept lighted, as illustrated in FIGS. 8C and 8D.

Figure 9A:
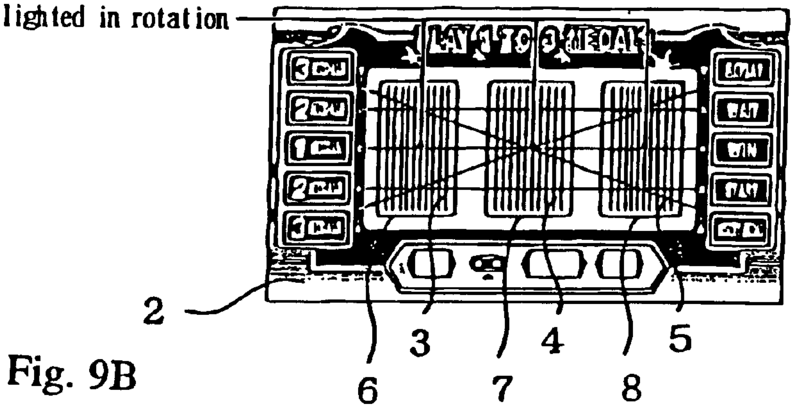
FIGS. 9A to 9D are diagrams showing a second interlocking display mode (reel lamp extinguishing pattern 1) to be informed to the player by the connective staging means in the game process of the slot machine according to the embodiment.
Figure 9B:
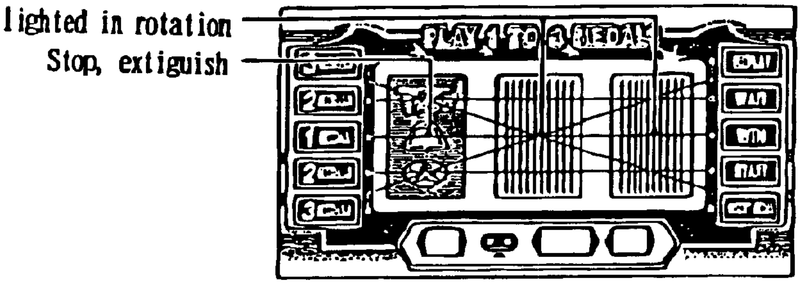
Figure 9C:
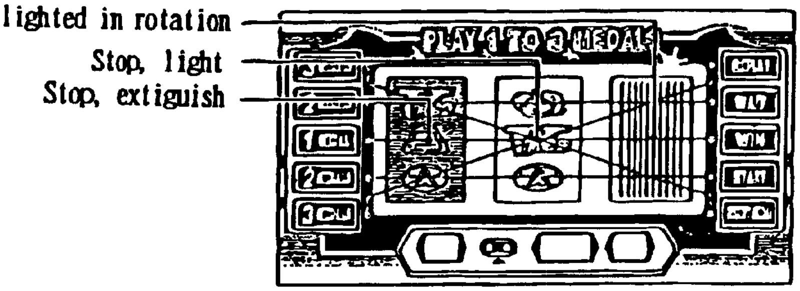
Figure 9D:
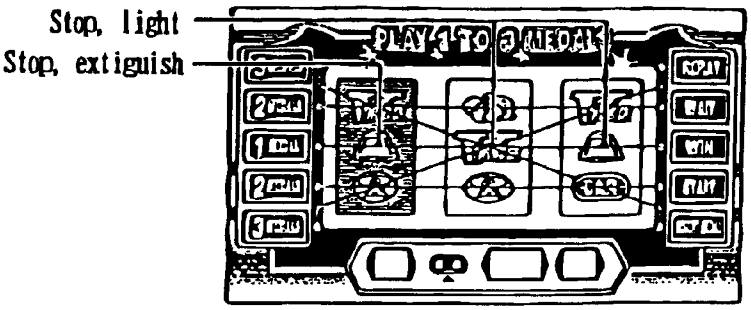

The second connective staging mode, as illustrated in FIGS. 9A to 9D, designates "reel lamp extinguishing pattern 1", in which the connective staging means lights all the back lamps 57*a* to 57*c* during the rotation of the individual reels 3 to 5, as illustrated in FIG. 9A. In case the first stop button 16 is operated to stop the rotation of the first reel 3, however, the individual back lamps 57*a* to 57*c* of the first reel 3 are extinguished, as illustrated in FIG. 9B. In case the rotations of the second and third reels 4 and 5 are successively stopped by operating the second and third stop buttons 17 and 18, furthermore, the individual back lamps 57*a* to 57*c* of the second and third reels 4 and 5 are also kept lighted, as illustrated in FIGS. 9C and 9D.

Figure 10A:
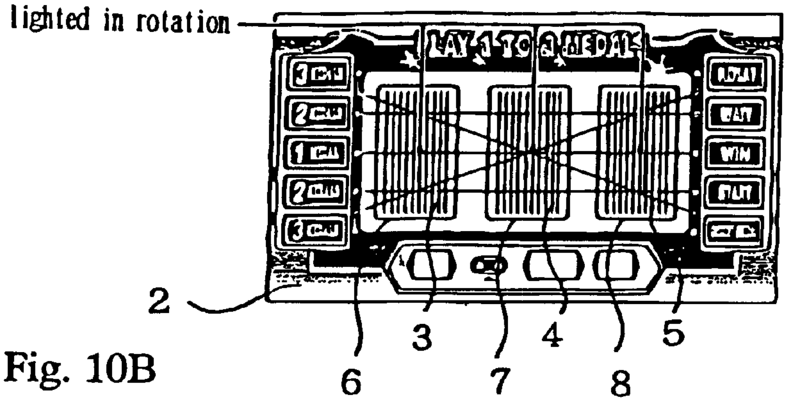
FIGS. 10A to 10D are diagrams showing a third interlocking display mode (reel lamp extinguishing pattern 2) to be informed to the player by the connective staging means in the game process of the slot machine according to the embodiment.
Figure 10B:
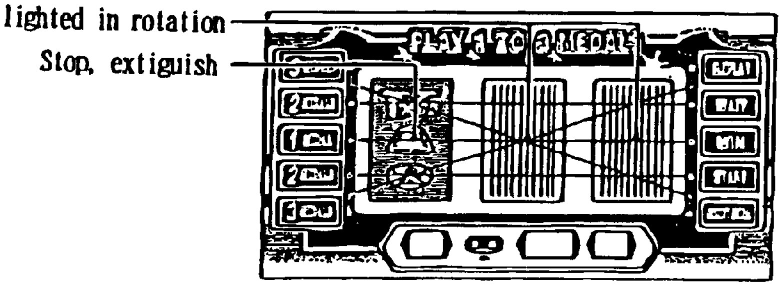
Figure 10C:
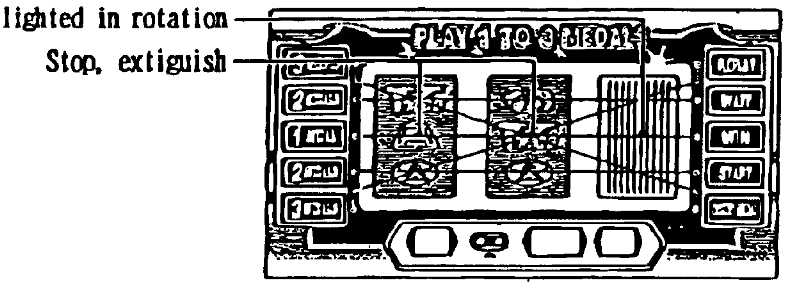
Figure 10D:
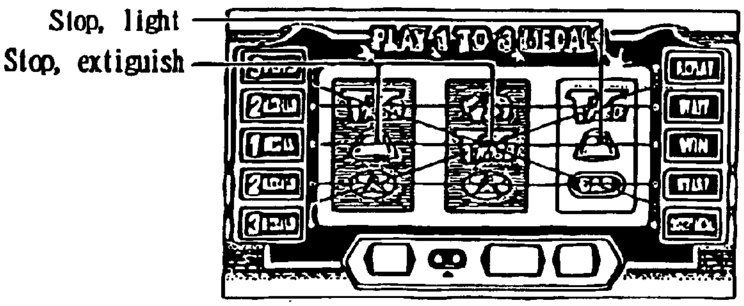

The third connective staging mode, as illustrated in FIGS. 10A to 10D, designates "reel lamp extinguishing pattern 2", in which the connective staging means lights all the back lamps 57*a* to 57*c* during the rotation of the individual reels 3 to 5, as illustrated in FIG. 10A. In case the first stop button 16 is operated to stop the rotation of the first reel 3, the individual back lamps 57*a* to 57*c* of the first reel 3 are extinguished, as illustrated in FIG. 10B. In case the rotation of the second reel 4 is stopped by operating the second stop button 17, the individual back lamps 57*a* to 57*c* of the second reel 4 are extinguished, as illustrated in FIGS. 10C. In case the rotation of the third reel 5 is stopped by operating the third stop button 18, furthermore, the individual back lamps 57*a* to 57*c* of the third reel 5 is are kept lighted, as illustrated in FIGS. 10D.

Figure 11A:
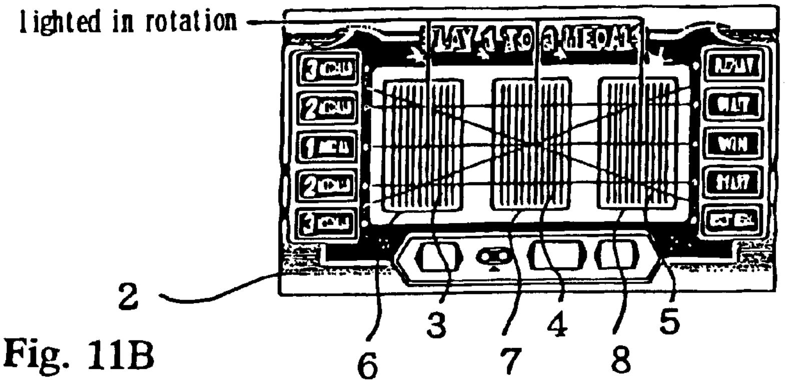
FIGS. 11A to 11D are diagrams showing a fourth interlocking display mode (reel lamp extinguishing pattern 3) to be informed to the player by the connective staging means in the game process of the slot machine according to the embodiment.
Figure 11B:
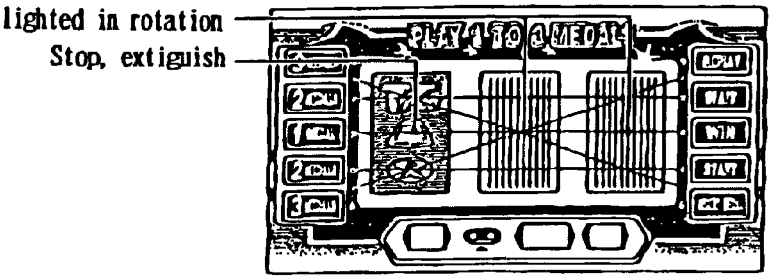
Figure 11C:
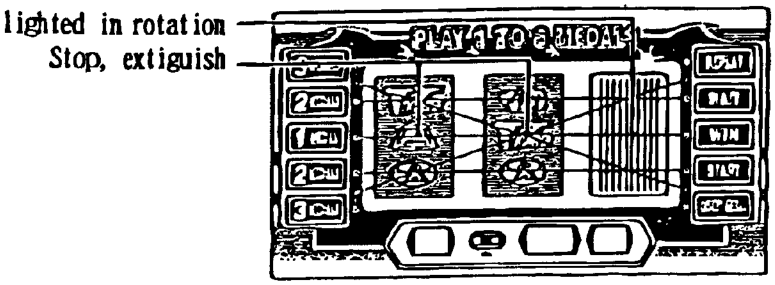
Figure 11D:
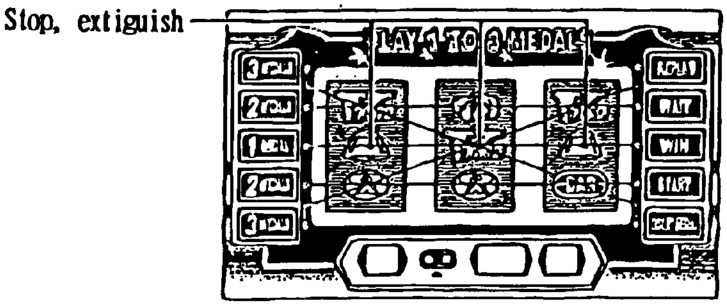

The fourth connective staging mode, as illustrated in FIGS. 11A to 11D, designates "reel lamp extinguishing pattern 3", in which the connective staging means lights all the back lamps 57*a* to 57*c* during the rotation of the individual reels 3 to 5, as illustrated in FIG. 11A. In case the first stop button 16 is operated to stop the rotation of the first reel 3, however, the individual back lamps 57*a* to 57*c* of the first reel 3 are extinguished, as illustrated in FIG. 11B. In case the rotations of the second and third reels 4 and 5 are successively stopped by operating the second and third stop buttons 17 and 18, furthermore, the individual back lamps 57*a* to 57*c* of the second and third reels 4 and 5 are individually extinguished, as illustrated in FIGS. 11C and 11D.

The timing charts illustrated in FIGS. 12A to 12K indicate the timings of the individual portions when the individual back lamps 57*a* to 57*c* are controlled to light according to the fourth connective staging mode. When the start lever 15 is operated at the timing illustrated in FIG. 12J, the later-described prize mode determinating lottery operation is carried out at the timing illustrated in FIG. 12K, and the individual reels 3, 4 and 5 successively rotate altogether, as illustrated in FIGS. 12A, 12B and 12C. When the first reel stop button 16, the second reel stop button 17 and the third reel stop button 18 are operated in this order, as shown in FIGS. 12D, 12E and 12F, the first reel 3, the second reel 4 and the third reel 5 are stopped at the respective timings, as illustrated in FIGS. 12A, 12B and 12C, and the individual back lamps 57*a* to 57*c* of the first, second and third reels 3, 4 and 5 are extinguished at the timings illustrated in FIGS. 12G, 12H and 12I. As a result, the displays of the individual reels 3 to 5 are staged in the fourth connective staging modes, as illustrated in FIGS. 11A to 11D, in connection with the individual stop button operations of the individual reels 3 to 5.

Here, the reel stop control is conveniently explained in this embodiment in case the first reel stop button 16, the second reel stop button 17 and the third reel stop button 18 are operated in this order, as illustrated in FIGS. 12D, 12E and 12F, to stop the first reel 3, the second reel 4 and the third reel 5 in this order, as illustrated in FIGS. 12A, 12B and 12C. However, the order of stopping the individual reels 3 to 5 should not be limited thereto but may be exemplified in a random operating order in which the first reel stop button 16, the third reel stop button 18 and the second reel stop button 17 are stopped in the recited order.

Furthermore, the lamp drive circuit 48, the back lamps 57*a* to 57*c* and the micon 30 also constitute stop staging means for staging the displays of the individual reels 3 to 5 in one of the ten kinds of display modes when all the rotational displays of the individual reels 3 to 5 are stopped. The display modes to be staged by this stop staging means are selected according to the kinds of the prize modes, as will be described hereinafter.

FIGS. 13 to 26 show one example of ten kinds of stop display modes to be staged by the stop staging means. Notations (1), (2) and (3) in the column "flashing pattern" of those Figures designate the individual back lamps 57*a* of the reels 3, 4 and 5; notations (4), (5) and (6) the individual back lamps 57*b* of the reels 3, 4 and 5; and notations (7), (8) and (9) the back lamps 57*c* of the reels 3, 4 and 5. Furthermore, the hatched portions indicate a lamp lighted state, and the blank portions indicate the lamp extinguished state. Furthermore, the "stage" columns of the Figures indicate the elapsing stages of time so that the individual back lamps 57*a* to 57*c* are lighted or extinguished, as shown, at every stages.

The display mode of the "no reel lamp flashing" or the first stop display mode is not shown, but the stop staging means keeps all the back lamps 57*a* to 57*c* of the individual reels 3 to 5 lighted when all the reels 3 to 5 are stopped but does not control them to flash.

Figure 13:
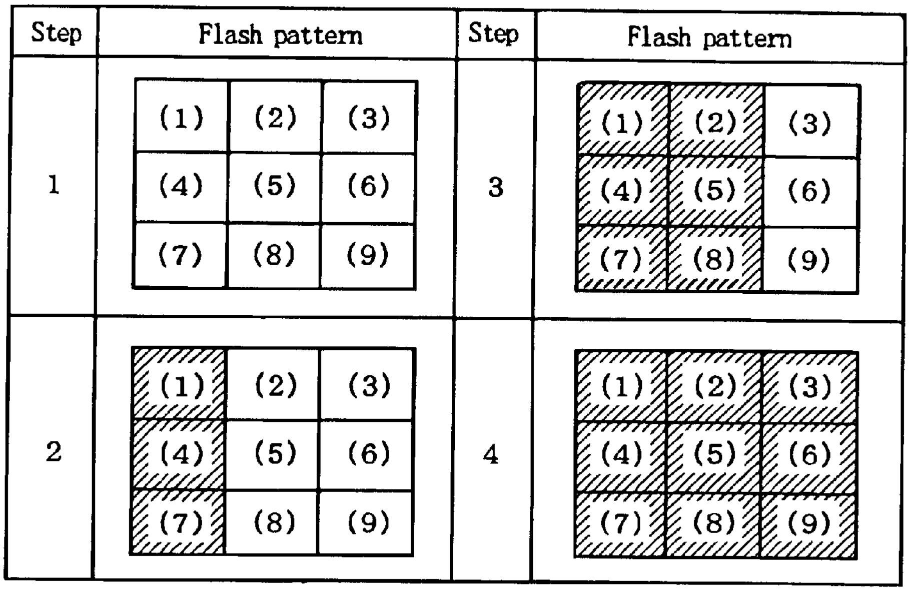
FIG. 13 is a diagram illustrating a second stop display mode (or a reel lamp flashing pattern 1) informed by the player by the stop staging means in the game process of the slot machine according to the embodiment.

The second stop display mode shown in FIG. 13 is that of the "reel lamp flashing pattern 1", and the stop staging means extinguishes all the back lamps 57*a* of the individual reels 3 to 5, as shown at a stage 1 in FIG. 13, when all the reels 3 to 5 are stopped. Successively, as shown at a stage 2, the stop staging means lights the individual back lamps 57*a* to 57*c* of the first reel 3 and then lights the individual back lamps 57*a* to 57*c* of the second reel 4, as shown at a stage 3. After this, the stop staging means lights the individual back lamps 57*a* to 57*c* of the third reel 5 and then lights all the back lamps 57*a* to 57*c* of the individual reels 3 to 5, as shown at a stage 4.

Figure 14:
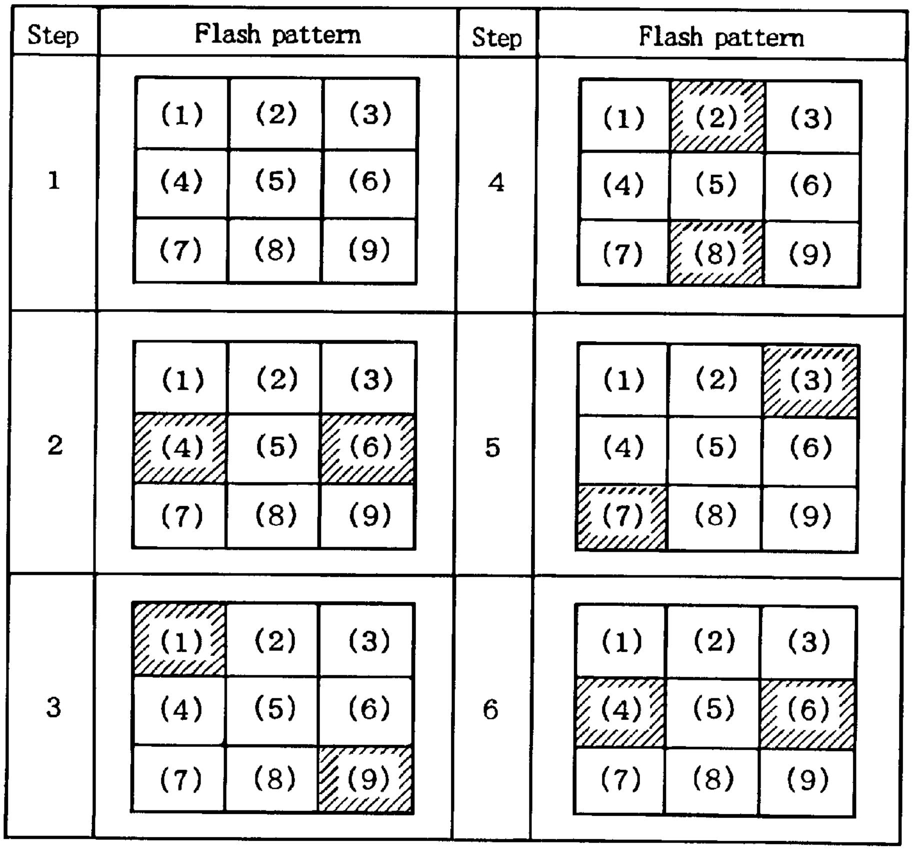
FIG. 14 is a diagram illustrating a third stop display mode (or a reel lamp flashing pattern 2) informed by the player by the stop staging means in the game process of the slot machine according to the embodiment.

The third stop display mode shown in FIG. 14 is that of the "reel lamp flashing pattern 2". The stop staging means extinguishes at first all the back lamps 57*a* of the individual reels 3 to 5, as shown at the stage 1 in FIG. 14, when all the reels 3 to 5 are stopped. Successively, the stop staging means lights the individual back lamps 57*b* of the first reel 3 and the third reel 5, as shown at the stage 2, and then lights the back lamps 57*a* of the first reel 3 and the back lamps 57*c* of the third reel 5, as shown at the stage 3. After this, the stop staging means lights the individual back lamps 57*a* and 57*c* of the second reel 4, as shown at the stage 4, and then lights the back lamps 57*c* of the first reel and the back lamps 57*a* of the third reel 5, as shown at a stage 5. Finally, the stop staging means lights the back lamps 57*b* of the first reel 3 and the back lamps 57*b* of the third reel 5, as shown at a stage 6.

Figure 15:
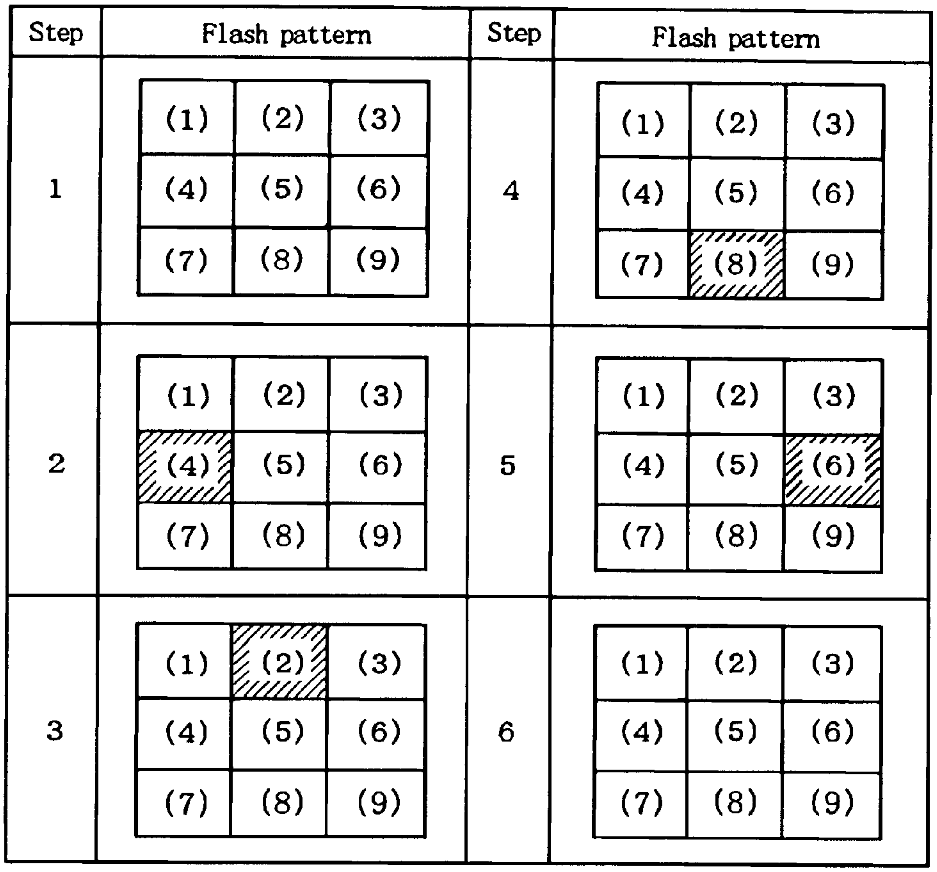
FIG. 15 is a diagram illustrating a fourth stop display mode (or a reel lamp flashing pattern 3) informed by the player by the stop staging means in the game process of the slot machine according to the embodiment.

The fourth stop display mode shown in FIG. 15 is that of the "reel lamp flashing pattern 3". The stop staging means extinguishes at first all the back lamps 57*a* of the individual reels 3 to 5, as shown at the stage 1 in FIG. 15, when all the reels 3 to 5 are stopped. Successively, the stop staging means lights the back lamps 57*b* of the first reel 3, as shown at the stage 2, and then lights the back lamps 57*a* of the second reel 4, as shown at the stage 3. After this, the stop staging means lights the back lamps 57*c* of the second reel 4, as shown at the stage 4, and then lights the back lamps 57*b* of the third reel 5, as shown at the stage 5. Finally, the stop staging means extinguishes all the back lamps 57*a* to 57*c* of the individual reels 3 to 5, as shown at the stage 6.

Figure 16:
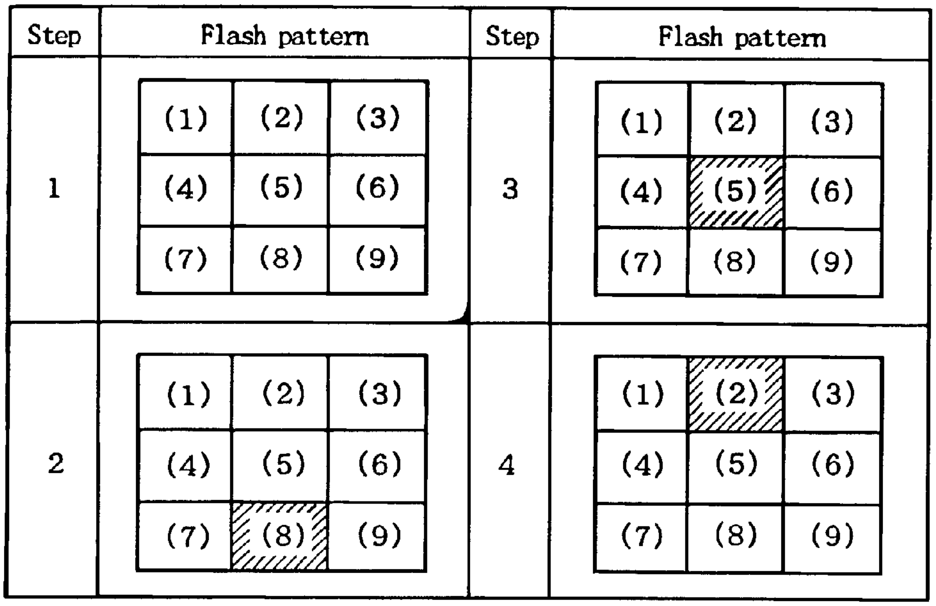
FIG. 16 is a diagram illustrating a front half of a fifth stop display mode (or a reel lamp flashing pattern 4) informed by the player by the stop staging means in the game process of the slot machine according to the embodiment.
Figure 17:
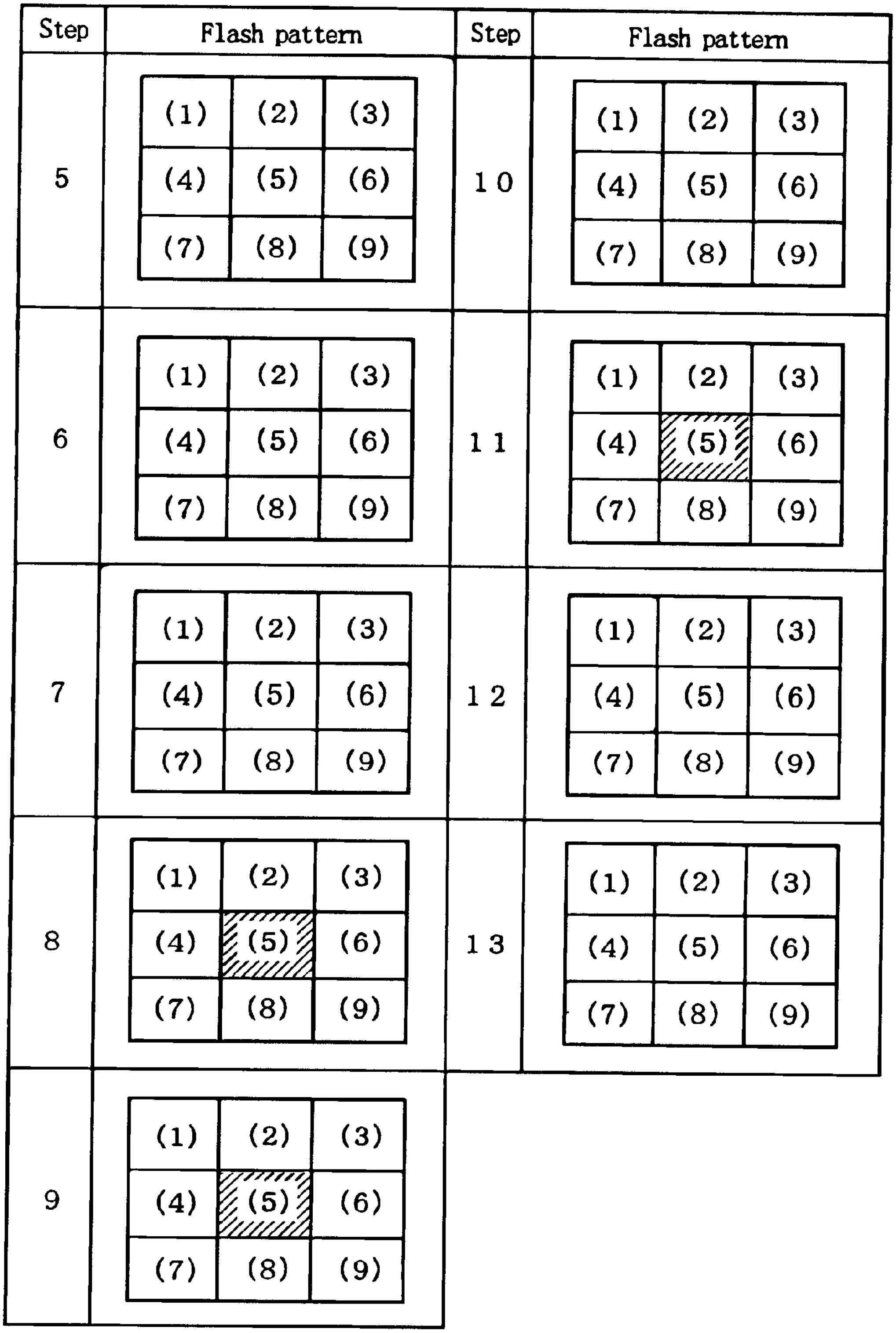
FIG. 17 is a diagram illustrating a rear half of the fifth stop display mode (or the reel lamp flashing pattern 4) informed by the player by the stop staging means in the game process of the slot machine according to the embodiment.
Figure 18:
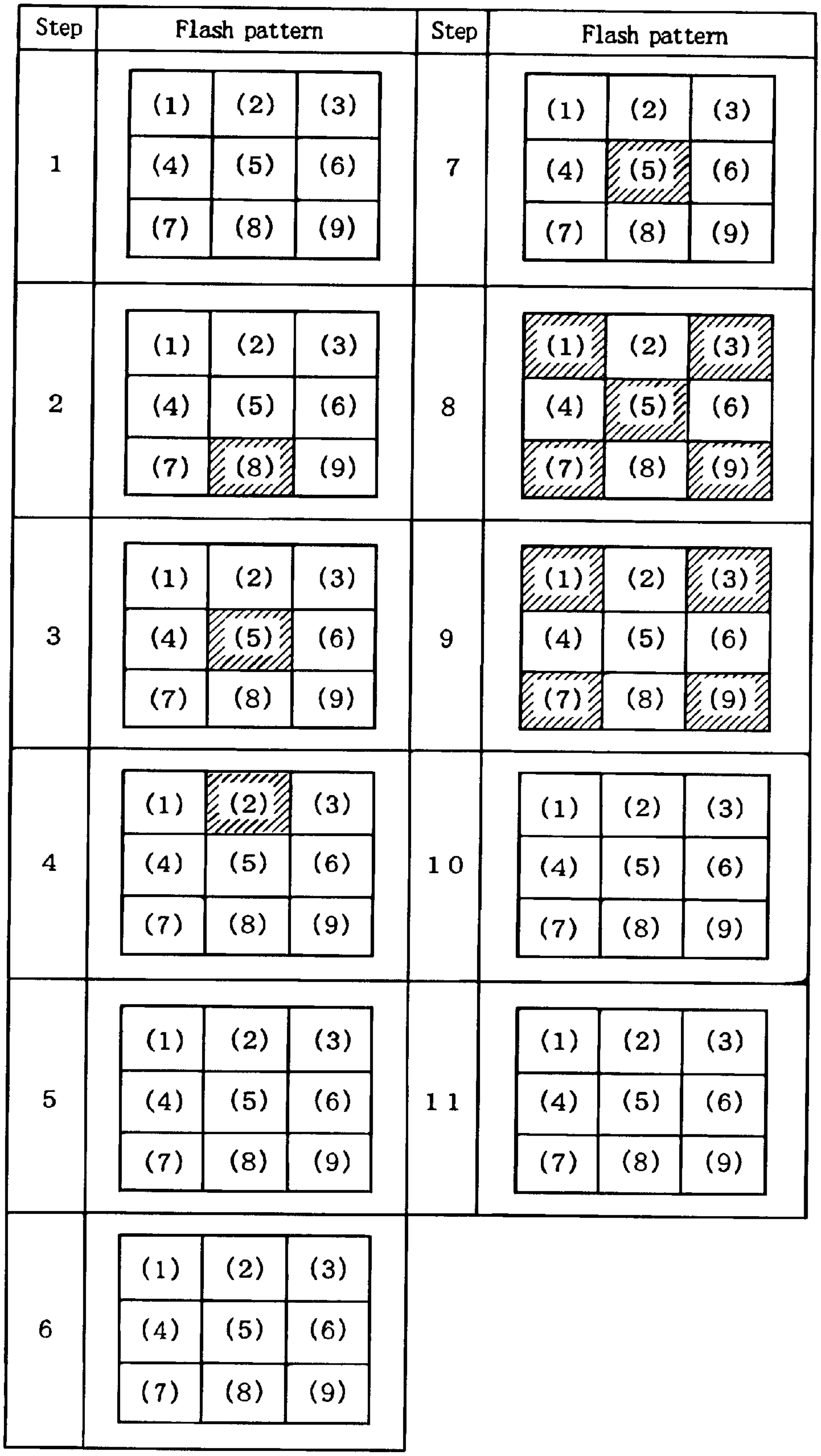
FIG. 18 is a diagram illustrating a sixth stop display mode (or a reel lamp flashing pattern 5) informed by the player by the stop staging means in the game process of the slot machine according to the embodiment.
Figure 19:
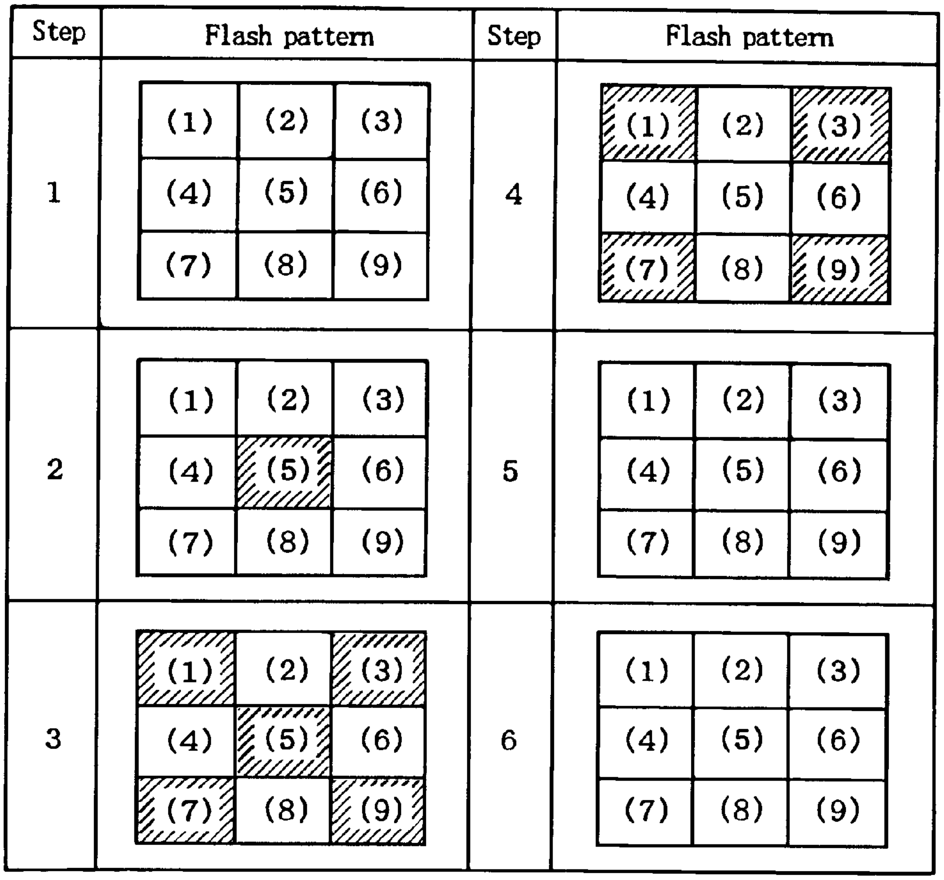
FIG. 19 is a diagram illustrating a seventh stop display mode (or a reel lamp flashing pattern 6) informed by the player by the stop staging means in the game process of the slot machine according to the embodiment.
Figure 20:
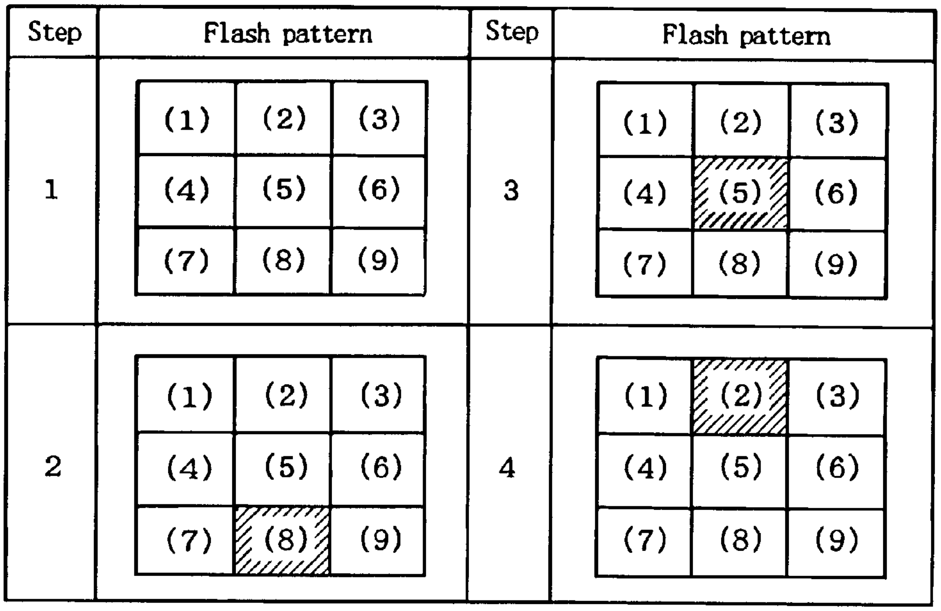
FIG. 20 is a diagram illustrating a front half of an eighth stop display mode (or a reel lamp flashing pattern 7) informed by the player by the stop staging means in the game process of the slot machine according to the embodiment.
Figure 21:
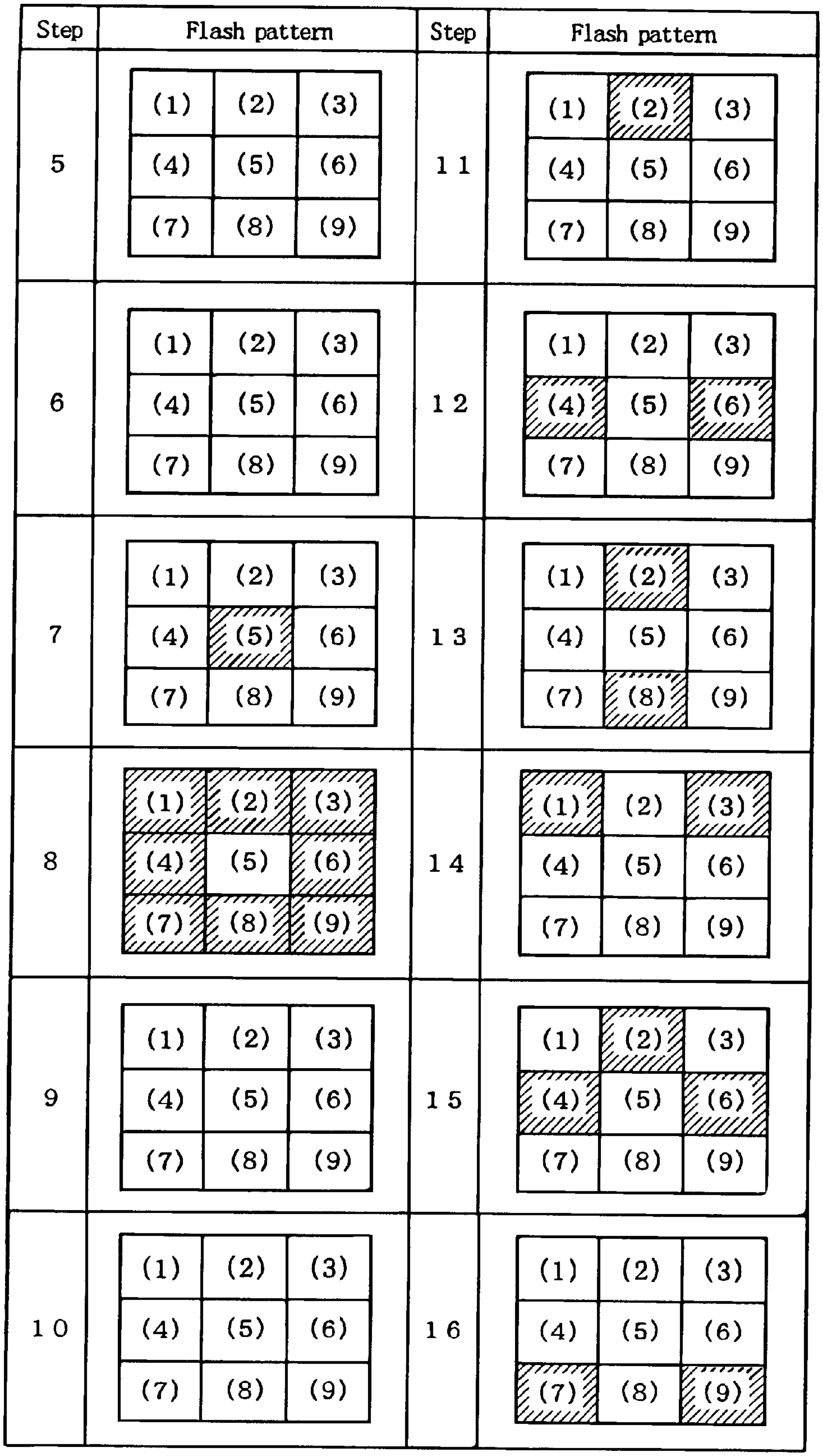
FIG. 21 is a diagram illustrating an intermediate half of the eighth stop display mode (or the reel lamp flashing pattern 7) informed by the player by the stop staging means in the game process of the slot machine according to the embodiment.
Figure 22:
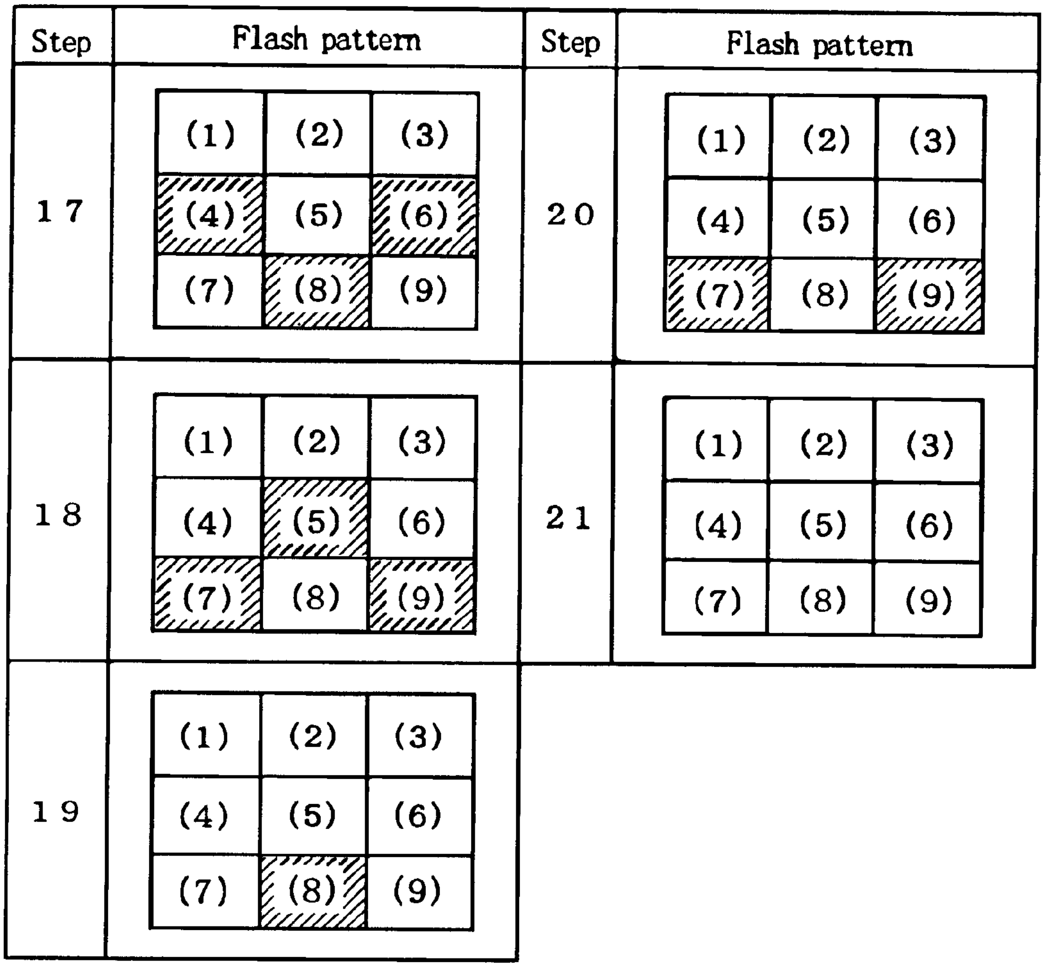
FIG. 22 is a diagram illustrating a rear half of the eighth stop display mode (or the reel lamp flashing pattern 7)

The fifth stop display mode of the stages 1 to 13, as shown in FIGS. 16 and 17, are those of the "reel lamp flashing pattern 4", and the sixth stop display mode of the stages 1 to 11, as shown in FIG. 18, are those of the "reel lamp flashing pattern 5". The seventh stop display mode of the stages 1 to 6, as shown in FIG. 19, are those of the "reel lamp flashing pattern 6", and the eighth stop display mode of the stages 1 to 21, as shown in FIGS. 20, 21 and 22, are those of the "reel lamp flashing pattern 7". Furthermore, the ninth stop display mode of the stages 1 to 12, as shown in FIG. 23, are those of the "reel lamp flashing pattern 8", and the tenth stop display mode of the stages 1 to 28, as shown in FIGS. 24, 25 and 26, are those of the "reel lamp flashing pattern 9".

In the reel lamp flashing patterns of FIGS. 16 to 26, the individual back lamps 57*a* to 57*c* of the individual reels 3 to 5 are controlled to flash by the stop staging means in accordance with the reading method similar to that of the reel lamp flashing patterns of FIGS. 13 to 15.

As shown in FIG. 6, the ROM 32 is stored with a game processing procedure to be executed in the slot machine 1 as a sequence program, as well as a prize probability table, a symbol table, a prize symbol combination table, a demonstration lottery table selecting table, a demonstration lottery table, and so on, which are individually classified from one another.

The prize probability table constitutes random number classifying means for classifying the random numbers, as sampled by the sampling circuit 37 into the individual prize modes, and stores the data for classifying the random numbers in constant ranges, as generated by the random number generator 36, into the individual prize modes. This prize probability table is constructed, as shown in FIG. 27. Notations a1 to a3, b1 to b3, c1 to c3, d1 to d3, e1 to e3, f1 to f3, and g1 to g3 in FIG. 27 designate the preset numerical value data which are used for classifying the random numbers, as sampled by the sampling circuit 37, into the individual prize modes. According to the data, there are used combinations of the individual numerical values of "a1 to g1" when the number of inputted coins is one, "a2 to g2" when the number is two, and "a3 to g3" when the number is three.

These numerical values are set under large or small relationship of "a<b<c<d<e<f<g". When the sampled random number value is less than a, a big hit prize (or big hit) is provided, and a "BB" hit flag is erected. When the sampled random number value is equal to or more than a and less than b, furthermore, a medium hit prize (or medium hit) is provided, and an "RB" hit flag is erected. When the sampled random number value is equal to or more than b and less than f, a small hit prize (or small hit) is provided. In this case: when the value is equal to or more than b and less than c, a "watermelon" hit flag is erected; when the value is equal to or more than c and less than d, a "bell" hit flag is erected; when the value is equal to or more than d and less than e, a "4 cherry" hit flag is erected; and when the value is equal to or more than e and less than f, a "2 cherry" hit flag is erected. When the sampled random number value is equal to or more than f and less than g, furthermore, a "replay" hit flag is erected, and when the value is equal to or more than g, a "blank" hit flag with no prize is erected.

That is, the prize mode is determined depending upon which numeral value range the sampled random number value belongs to, and is represented by a total of eight kinds of hit flags including "blank" and "replay". In this case, the random number generator 36, the sampling circuit 37, the prize probability table and the micon 30 constitute prize mode determining means. The various hits are made under probabilities according to the data setting in the prize probability table. Therefore, the various hits are not extremely controlled by the skill of the player, and a total coin pay rate in, for example, the business hours of one day is maintained substantially constant.

Furthermore, the symbol table is conceptionally illustrated in FIG. 28. The symbol table corresponds the rotational positions of the individual reels 3 to 5 to symbols, and represents the symbol columns by the notations. The symbol table is stored with symbol codes corresponding to the code numbers. These code numbers are successively provided at constant rotational pitches of the reels 3 to 5 with reference to the rotational position for generating the aforementioned reset pulse. The symbol codes designate the symbols which are provided to correspond to the individual code numbers.

Furthermore, the prize symbol combination table is stored with the symbol codes of the individual prize symbol combinations which are displayed on the prize display portion 22, the symbol codes of the symbol combinations constituting the "reach spot" indicating the player that the flags for causing a specific game are established, the prize determination codes representing the individual prizes, the number of coins for the prize, and so on. The prize symbol combination table is referred to, when the first reel 3, the second reel 4 and the third reel 5 are controlled to stop and when the prize is confirmed after stopping all the reels.

Furthermore, the demonstration lottery table selecting table and the demonstration lottery table constitute information mode selecting means for selecting the combination of the kinds of the game starting sounds, the kinds of the connective display modes and the kinds of the stop display modes in accordance with the prize mode which is determined by the aforementioned prize mode determining means. Furthermore, the information mode selecting means, the sound emitting means, the connective staging means and the stop staging means constitute information means for informing the player of a prize mode at a predetermined probability through a series of flow of the slot machine game. The selection lottery operation of the information mode by the information mode selecting means is timed successive to the prize mode probability lottery timing, as shown in FIG. 7E or 12K.

The demonstration lottery table selecting table shown in FIG. 29 is provided for selecting the demonstration lottery tables of No. 0 to No. 17 shown in FIGS. 30 to 32 from a game state and a hit flag. The game state becomes clear by referring to a storing region of the game level status (GMLVSTS) shown in FIG. 33A. The GMLVSTS storing region is stored as data of 1 byte in the RAM 33. The game state is stored at 0 to 4 bits, and the game state, as turned ON by setting the data to 1, is one of that time.

As indicated by GMLVSTS, according to the kind of the game state, there are five kinds of the "RB operation", the "BB operation", the "general game", the "inner hit of RB" and the "inner hit of BB". Notation RB signifies the aforementioned regular bonus game and in this RB game, a bonus game in which a plurality of times of high prize games constitute one set can be carried out once. The "RB operation" represents a state of game in the RB game, and either blank or JAC hit is caused. Furthermore, notation BB signifies the aforementioned big bonus game, and in the BB game, sets of general games and the aforementioned bonus game can be carried out a plurality of times. The "BB operation" signifies the game state in the BB game. Furthermore, the "general game" is a state of game in which no prize is caused. The "inner hit of RB" and the "inner hit of BB" represent a general game state, in which although the RB hit flag or the BB hit flag is erected, a predetermined prize combination of symbols is not stopped to display, nor is the game in the RB game or the BB game yet.

The hit flag becomes clear by referring to the storing region of the flag counter (FLGCTR) shown in FIG. 33B. This FLGCTR storing region is also stored as data of 1 byte in the RAM 33. The hit flag of that time is indicated by 1 byte data of 00 to 07 of hexadecimal digits.

For example, when data of 2 bits of the GMLVSTS is set to 1 (04H) and when data of the FLGCTR is 07H, the game state is the general game, and the hit flag is the BB. Accordingly, the demonstration lottery table at that time is No. 7 demonstration lottery table from the demonstration lottery table selecting table. The demonstration lottery table of No. 7 is shown in FIG. 31, and the kind of the game starting sound, the kind of the pattern of extinguishing the back lamps of the reels and the kind of the pattern of flashing the back lamps of the reels are selected by the later-described lottery, using the lottery values indicated by the table.

The kind of the pattern of extinguishing the reel lamps corresponds to that of the connective display mode, and the kind of the pattern of flashing the reel lamps correspond to that of the stop display mode. When the combination of the column of a lottery value 18 is selected from the No. 7 demonstration lottery table, for example, the game starting sound is 2, the reel lamp extinguishing pattern is the pattern 3, and the reel lamp flashing pattern is the pattern 9. By the combination of these individual staging modes, the player is informed as a prediction of the fact that the BB flag is hit during the general game.

When a combination of a column of a lottery value 55 is selected by the demonstration lottery table of No. 7 in the aforementioned case in which the game level status is the general game and in which the flag counter is the inner hit of BB, furthermore, the game starting sound is 1, the reel lamp extinguishing pattern is no extinguishment, and the reel lamp flashing pattern is no flash. When the data of 2 bits of the GMLVSTS is set to 1 and when the data of the FLGCTR is 00H, on the other hand, the game state is the general game, and the hit flag becomes a blank. The demonstration lottery table at that time becomes the demonstration lottery table of No. 0 from the demonstration lottery table selecting table. The demonstration lottery table of No. 0 is shown in FIG. 30. When a column of a lottery value 100 is selected by lottery from the table, the staging mode combination at that time are also that the game starting sound is 1, that the reel lamp extinguishing pattern is no extinguishment, and that the reel lamp flashing pattern is no flash. That is, even in the game establishing different hit flags, depending on a value of a random number for determining a pattern for informing a prediction, the same prediction informing pattern may appear.

In this way, the kind of a hit flag is informed to the player in accordance with the combination of staging modes, which is determined by the game state at that time, and the reliability is not uniform. For example, even when the prediction informing operation of the BB flag hit in the general game is carried, as described hereinbefore, the BB flag is not necessarily hit at that time. That is, the probability of informing a prediction when the BB flag is hit in the general game is X (=0 to 100) %, and the probability of informing a prediction even when the BB flag is not hit in the general game is (100−X) %.

Furthermore, the probability of informing a prediction of the RB or BB flag hit in the inner hit of the RB or the inner hit of the BB is previously determined to a predetermined value in a range of 0 to 100%. FIG. 34 shows eleven kinds of determined patterns in which the informing operation of predicting the RB or BB flag hit is carried out at a probability of 100% in the inner hit of the RB or the inner hit of the BB. That is, the prediction information of the combination of the individual staging modes of the staging mode combination of the game starting sound, the reel lamp extinguishing pattern and the reel lamp flashing pattern appears in the inner hit of the RB or the inner hit of the BB, as shown in FIG. 34, only when the RB or BB flag is hit but not when the RB or BB flag is not hit.

The table of the pattern of the combination of the staging modes, as shown in FIG. 34, in which the RB or BB game is determined, is also previously stored in a predetermined region of the ROM 32.

Furthermore, the micon 30, the lamp drive circuit 48 and the notification lamp 25 constitute notification means for notifying the information to the player by the display of a displayer (or the notification lamp 25 in the embodiment) when the information corresponding to a specific prize mode (e.g., the inner hit of the RB or BB in the embodiment) determined by the prize mode determining means is informed to the player by the notification means at the probability of 100%.

Next, an explanation will be given of the operation of the game machine which is controlled by the micon 30 in the embodiment.

FIGS. 35 and 36 are flowcharts showing an outline of the game process.

First of all, it is determined by the CPU 31 (Step 101 of FIG. 35) whether or not a coin BET has been carried out. The answer is "YES" when a coin is inserted into the coin slot 9 so that a detection signal is inputted from the coin sensor 9S or signals are inputted from the BET switches 10, 11 and 12. In this case, all the back lamps 57*a*, 57*b* and 57*c* built in the first reel 3, the second reel 4 and the third reel 5 are lighted by the control of the lamp drive circuit 48 by the CPU 31. Next, it is determined (at Step 102) whether or not a start signal has been inputted from the start switch 15S by operating the start lever 15.

When this answer is "YES", the determination of prize (or probability lottery operation) is carried out by the prize mode determining means (at Step 103). As described hereinbefore, the prize determination is made by determining which prize group in the prize probability table (as shown on FIG. 27) one random number generated in the random number generator 36 and specified by the sampling circuit 37 belongs to. In respect of the prize mode determined by the prize mode determining means, data of either one of eight kinds of the "blank", the "2 cherries", the "4 cherries", the "bell", the "watermelon", the "replay", the "RB" and the "BB" are written and temporarily assigned in the aforementioned FLGCTR (as shown on FIG. 33B).

Successive to the prize determining operation, the informing selection lottery operation of the prize mode is carried out (at Step 104). The informing selection lottery operation of the prize mode is carried out according to a flowchart shown in FIG. 37.

At first, the GMLVSTS region (FIG. 33A) stored in the RAM 33 is referred to, and the game state at that time is determined (at Step 201 in FIG. 37). Next, the data stored in the FLGCTR are referred to, and the kind of the hit flag is determined (at Step 202). Next, one of the demonstration lottery tables of No. 0 to No. 17 is selected by referring to the demonstration lottery table selection table (FIG. 29) from the game state at that time and the kind of the hit flag (at Step 203). Next, a count value C is sampled at an arbitrary timing from a counter for refreshing the RAM 33 at constant time intervals (at Step 204).

The count value C is varied in a range of 0 to 127, and the random number lottery for selecting the informing mode is carried out by using the sampled count value C. That is, a lottery value R at the topmost column in the demonstration lottery table selected at Step 203 is subtracted from the count value C, and the positiveness or negativeness of the subtraction result A (=C−R) is determined (at Step 205). When the subtraction result A is not negative, a lottery value at a successive column of the table is set to the lottery value R (at Step 206). After this, a subtraction of A−R is then carried out so that the positiveness or negativeness of the result A (=A−R) is determined (at Step 207). The operation is carried out until the subtraction result A becomes negative. When the result becomes negative, a reel lamp extinguishing pattern of the column of the lottery value R is selected as a staging mode for informing a prediction (at Step 208).

For example, when the BB flag is hit in the general game, as described hereinbefore, the demonstration lottery table of No. 7 is selected, and the selection lottery operation of the staging mode at this time is carried out, as follows. At first, when a value 50 is sampled as the refresh counter value C at Step 204, in the subtraction of c−R at Step 205, a lottery value 55 at the topmost column is firstly set to the lottery value R, and the subtraction result is formed as A=50−55=−5. Since the subtraction result A is negative, at the step 208, the combination of the staging modes of the column of the lottery value 55, that is, the combination of the staging modes of the game starting sound 1, no reel lamp extinguishment and no reel lamp flashing is selected to the prediction informing mode.

When the "watermelon" is hit in the inner hit of the BB, a demonstration lottery table of No. 16 is selected (FIG. 29), and the selection lottery operation of the staging mode combination at this occasion is carried out, as follows. At first, at the step 204, when a value 61 is sampled as the refresh counter value C, in the subtraction of C−R of the step 205, a lottery value 30 at the topmost column is firstly set to the lottery value R so that the subtraction result is formed as A=61−30=31. Since the subtraction result is positive, at the step 206, a lottery value 32 at a successive column of the table is set to the lottery value R so that the positiveness or negativeness of the subtraction result of A=31−32=−1 is determined at the step 207.

Since the subtraction result A is negative, at the step 208, the combination of the staging modes of the column of the lottery value 32, that is, the combination of the staging modes of the game starting sound 1, the reel lamp extinguishing pattern 3 and the reel lamp flashing pattern 3 is selected as the prediction informing mode.

Next, a game starting sound emitting operation is carried out (at Step 105 of FIG. 35). This operation is carried out according to the staging mode combination which is selected by the aforementioned information selection lottery operation, and the speaker drive circuit 43 is controlled by the CPU 31 in accordance with the kind of the game starting sound so that one of the game starting sound 1 and 2 is outputted from the speaker 39. These game starting sounds 1 and 2 are emitted from the sound emitting hole 19 formed in the lower portion of the front face of the machine so that they can be grasped by the auditory sense of the player.

In case the BB flag is hit in the general game so that the staging mode combination of the column of the lottery value 55 of the demonstration lottery table No. 7 is selected, for example, the game starting sound is emitted. In case the watermelon is hit in the internal hit of the BB so that the staging mode combination of the column of the lottery value 32 of the demonstration lottery table No. 16 is selected, as described hereinbefore, the game starting sound is emitted.

Next, the rotating operation of the first reel 3, the second reel 4 and the third reel 5 is carried out (at Step 106), the individual reels 3, 4 and 5 start rotating simultaneously. Successive to the reel rotating operation, the stop control of the individual reels 3, 4 and 5 is carried out (at Step 107). An outline of the reel stop control operation is shown by a flowchart in FIG. 38.

The operation of the individual stop buttons 16 to 18 by the player is detected by the CPU 31 through the reel stop signal circuit 45, as described hereinbefore. When the ON operation of the first reel stop button 16 is detected at Step 121 of FIG. 38, the stop control operation of the first reel 3 is carried out (at Step 122). That is, at a time point at which the first reel stop button 16 is operated by the player, the number of drive pulses supplied to the stepping motor 55 of the first reel 3 is read from the RAM 33 and is made to correspond to the rotational position of the first reel 3. When the rotational position of the first reel 3 is known, three symbols appearing in the observation window 6 are grasped as symbol codes by referring to the symbol table (FIG. 28).

In this case, when the hit flag of the big hit is erected, it is checked whether or not the symbol constituting the big hit is present on the effective prize line of the observation window 6. Similarly, when the hit flag of the medium hit or the small hit is erected, it is checked whether or not the symbol constituting the medium hit or the small hit is present on the effective prize line of the observation window 6. When the symbol corresponding to the hit flag is present on the effective prize line, the CPU 31 immediately stops the first reel 3. Considering that the first reel 3 cannot be stopped instantaneously, furthermore, the processing may be carried out at several steps before the rotational position of the reel.

When a symbol corresponding to the hit flag is not found on the effective prize line of the observation window 6 by the aforementioned check operation, it is checked what symbol appears when the first reel 3 is further rotated by four symbols. When a symbol corresponding to the hit flag is present on the effective prize line, the first reel 3 is rotated to the position of the symbol and is stopped there. This drawing control operation is also carried out in the individual stop control operations of the second reel 4 and the third reel 5, as will be described hereinafter.

Next, the control operation of the back lamps of the first reel is carried out (at Step 123). The control operation is carried out in accordance with the combination of the staging modes on the demonstration lottery table selected by the aforementioned informing selection lottery operation at Step 104, and the back lamps 57*a* to 57*c* built in the first reel 3 are controlled to light in accordance with the selected reel lamp extinguishing pattern.

For example, in the aforementioned case in which the BB flag is hit in the general play and in which the combination of the staging modes of the column of the lottery value 55 of the demonstration lottery table No. 7 is selected as no reel lamp extinguishment, the individual back lamps 57*a* to 57*c* of the first reel 3 are not extinguished, as shown in FIG. 8B. Furthermore, in the aforementioned case in which the watermelon is hit in the inner hit of the BB and in which the combination of the staging modes of the column of the lottery value 32 of the demonstration lottery table No. 16 is selected as the reel lamp extinguishing pattern 3, the individual back lamps 57*a* to 57*c* of the first reel 3 are extinguished, as shown in FIG. 11B. At this time, the second reel 4 and the third reel 5 are rotating so that the individual back lamps 57*a* to 57*c* of the individual reels 4 and 5 are lighted.

Next, it is detected (at Step 124) whether or not the stop button 17 of the second reel 4 is operated and when the ON operation of the stop button 17 is detected, the stop control operation of the second reel 4 is carried out (at Step 125). In this stop control operation, in a state of rotating the second reel 4, firstly, assuming that symbols of 21 ways having the code numbers of 0 to 20 are stopped on the prize line L1 at the center of the observation window 7, a combination with the symbol of the first reel 3 which has already been stopped on the effective prize line is read. Further, in respect of the third reel 5, a rotation code representing that the third reel 5 is rotating is read. Although the second reel 4 is also rotating, furthermore, its rotation code is not read because it is assumed that the second reel 4 is to be stopped by the aforementioned operation.

When a combination of symbol codes is read in this way, the aforementioned prize symbol combination table is referred to, in respect of the symbol determined by stopping the first reel 3, and what prize may be caused on the effective prize line when the second reel 4 is stopped at the 21 ways of rotational positions is successively determined. When the first reel 3 is stopped, for example, as shown in FIG. 39A, the symbol combination pattern at this time is checked in anticipation of the 21 ways of the stop positions of the second reel 4. When the second reel 4 is stopped at a code number "5", for example, as shown in FIG. 39B, the combination of symbols on the individual prize lines L1, L2A, L2B, L3A and L3B is as shown in FIG. 39C.

An arrow mark of the third reel 5 designates a rotation code indicating that the reel is rotating, and depending on the position of stopping the third reel, there are possibilities of causing a big hit prize of "A-A-A" on the prize line L1 and a small hit prize of "E-E-E" on the prize line L2B. In respect of the code number "5" of the second reel 4, as shown in FIG. 40, therefore, a prediction flag of the big hit and a prediction flag of the small hit are set. The presence or absence of the prediction flag is checked with respect to all the code numbers of the second reel 4, and these data are written in the RAM 33.

In this way, the prediction flag data written in the RAM 33 are referred to controlling to stop the second reel 4. That is, when the stop button 17 of the second reel 4 is operated, prediction flags corresponding to the code numbers of the second reel 4 are referred to. When a prediction of the big hit is caused, the control of stopping the second reel 4 is executed such that the symbol of the big hit is stopped on the effective prize line.

When the aforementioned reel stop control operation of Step 125 in FIG. 38 is finished, an operation of controlling the back lamps of the second reel is then carried out (at Step 126). In the control operation, too, the back lamps 57*a* to 57*c* built in the second reel 4 are controlled to light according to the reel lamp extinguishing pattern of the combination of the staging modes selected by the aforementioned informing selection lottery operation at Step 104.

For example, in the aforementioned case in which the BB flag is hit in the general game and in which the combination of the staging modes of the column of the lottery value 55 of the demonstration lottery table No. 7 is selected as no reel lamp extinguishment, as shown in FIG. 8C, the individual back lamps 57*a* to 57*c* of the second reel 4 are not extinguished. Furthermore, in the aforementioned case in which the watermelon is hit in the inner hit of the BB and in which the combination of the staging modes of the column of the lottery value 32 of the demonstration lottery table No. 16 is selected as the reel lamp extinguishing pattern 3, the individual back lamps 57*a* to 57*c* of the second reel 4 are extinguished, as shown in FIG. 11C. At this time, the third reel 5 is rotating so that the individual back lamps 57*a* to 57*c* of the third reel 5 are lighted.

Next, it is detected (at Step 127) whether or not the stop button 18 of the third reel 5 is turned ON. When the stop button 18 is turned ON, the operation of controlling to stop the third reel 5 is carried out (at Step 128). In this stop control operation, the first reel 3 and the second reel 4 have already been stopped, and a combination of symbols is specified. Therefore, a possibility of prize is determined with regard to the combination of symbols for each of the code numbers of the third reel 5, and a prize prediction flag is erected like the table shown in FIG. 40.

The prediction flag data are also referred to when the stop button 18 of the third reel 5 is operated. When a big hit prediction is established, the control of stopping the third reel 5 is executed such that the big hit symbol is stopped on the effective prize line. In the control to stop the third reel 5, the position of stopping the reel is controlled such that not only a prize according to the hit flag is obtained by a combination with the symbols of the first reel 3 and the second reel 4 already stopped but also a prize different from the hit flag is not obtained.

By the operation of controlling to stop the first reel at Step 122, by the operation of controlling to stop the second reel at Step 125 and by the operation of controlling to stop the third reel at Step 128, as described hereinbefore, when the hit flag is the "blank", the individual reels 3 to 5 are controlled to stop such that no prize combination of the symbols is set on any of the effective prize lines.

When the hit flag is the "2 cherries", furthermore, the individual reels 3 to 5 are controlled to stop such that the combination of the symbols "cherry" is set on any of the effective prize lines. When the hit flag is the "4 cherries", on the other hand, the individual reels 3 to 5 are controlled to stop such that the combination of symbols "cherry" is set on any two of the individual prize lines. When the hit flag is the "bell" or "watermelon", on the other hand, the individual reels 3 to 5 are controlled to stop such that the combination of symbols "bell" or "watermelon" is set on any of the effective prize lines.

When the hit flag is the "RB" or "BB", on the other hand, the individual reels 3 to 5 are controlled to stop such that a set of symbols "7" or predetermined character symbols is made on any of the prize lines.

Next, when the operation of controlling to stop the reels was finished, the control operation of the back lamps of the third reel is carried out (at Step 129). In the control operation, too, the back lamps 57*a* to 57*c* built in the third reel 5 are controlled to light according to the reel lamp extinguishing pattern having the staging control combination selected by the aforementioned informing selection lottery operation at Step 104.

For example, in the aforementioned case in which the BB flag is hit in the general game and in which the combination of the staging modes of the column of the lottery value 55 of the demonstration lottery table No. 7 is selected as no reel lamp extinguishment, the back lamps 57*a* to 57*c* of the third reel 5 are not extinguished, as shown in FIG. 8D. Therefore, the individual back lamps 57*a* to 57*c* of the first reel 3, the second reel 4 and the third reel 5 are not extinguished in connection with the operation of the individual stop buttons 16, 17 and 18 and are brought into a state where they remain "lighted, lighted and lighted".

Furthermore, in the aforementioned case in which the watermelon is hit in the inner hit of the BB and in which the combination of the staging modes of the column of the lottery value 32 of the demonstration lottery table No. 16 is selected as the reel lamp extinguishing pattern 3, as shown in FIG. 11D, the individual back lamps 57*a* to 57*c* of the third reel 5 are not extinguished. Accordingly, the individual back lamps 57*a* to 57*c* of the first reel 3, the second reel 4 and the third reel 5 are "extinguished, extinguished and extinguished" in this order in connection with the operation of the individual stop buttons 16, 17 and 18.

When the reel stop control operation of Step 107 of FIG. 35 was finished in this way, the reel lamp flashing control is carried out (at Step 108 of FIG. 35). In this reel lamp flashing control operation, too, in accordance with the reel lamp flashing pattern of the combination of the staging modes selected in the notifying selection lottery operation of Step 104, the individual back lamps 57*a* to 57*c* built in the first, second and third reels 3, 4 and 5 are controlled to flash.

For example, in the aforementioned case in which the BB flag is hit in the general game and in which the combination of the staging modes of the column of the lottery value 55 of the demonstration lottery table No. 7 is selected as no reel lamp flashing, the individual back lamps 57*a* to 57*c* of the first, second and third reels 3, 4 and 5 are not controlled to flash but are left lighted. In the aforementioned case in which the watermelon is hit in the inner hit of the BB and in which the combination of the staging modes of the lottery value 32 of the demonstration lottery table No. 16 is selected as the reel lamp flashing pattern 3, on the other hand, the individual back lamps 57*a,* 57*b* and 57*c* of the reels 3 to 5 are controlled to flash, as shown in FIG. 15.

Successively, the lighting control of the notification lamp 25 is carried out (at Step 109 of FIG. 35). This notification lamp control is carried out according to the flowchart of FIG. 41.

At first, eleven fixed patterns, as shown in FIG. 34, are referred to (at Step 301), and it is determined (at Step 302) what of the fixed patterns the pattern of the staging mode combination, in a series of flow of the game at this time, of the game starting sound, the reel lamp extinguishing pattern and the reel lamp flashing pattern coincides with. When no coincidence occurs, the routine is finished. When a coincidence occurs, it is then determined (at Step 303) whether or not the notification lamp 25 is being currently lighted. When the notification lamp 25 is not lighted, it is controlled to light by the lamp drive circuit 48 (at Step 304). When the notification lamp 25 is lighted, the routine is finished.

For example, in the aforementioned case in which the watermelon is hit in the inner hit of the BB and in which the combination of the staging modes of the column of the lottery value 32 of the demonstration lottery table No. 16 is selected, the game starting sound 1, the reel lamp extinguishing pattern 3 and the reel lamp flashing pattern 3 coincide with one of the fixed patterns 4 when they are staged in a series of flow of the game. In this case, therefore, the lamp drive circuit 48 is driven by the control of the micon 30 so that the notification lamp 25 is lighted.

In this case, the micon 30, the lamp drive circuit 48 and the notification lamp 25 constitute notification means for notifying the information to the player by the light display of the notification lamp 25, when the inner hit of the RB or BB determined by the prize mode determining means is informed to the player by the aforementioned staging at the probability of 100%.

FIGS. 42A to 42E are timing chart diagrams for lighting the notification lamp 25. This notification lamp 25 is lighted at a timing shown in FIG. 42A when the fixed pattern for fixing the BB or RB finished the display at a timing shown in FIG. 42B. When the inner hit flag of the BB or RB is turned ON, as shown in FIG. 42C and when a combination of symbols of the BB or RB is stopped and displayed at the stop of the individual reels 3 to 5 so that the BB or RB prize is caused at the timing shown in FIG. 42D, the notification lamp 25 is extinguished at the timing, as shown in FIG. 42E, to finish the pay-out of coins by the prize.

By thus lighting the notification lamp 25 on the condition of displaying the fixed pattern, the player can recognize that the informing prediction currently displayed is the prediction informing that the inner hit of the BB or RB is caused at the probability of 100%.

When the aforementioned notification lamp control was finished, the game processing determines whether or not the display after stopping all the reels constitutes a predetermined prize combination of symbols with reference to the prize symbol combination table (at Step 110 of FIG. 35). That is, the reel stop control is not carried out entirely by the machine, but the timings of operating the individual stop buttons 16 to 18 by the player matter. Even in case a prize hit flag is erected as a result of the inner lottery, therefore, the prize combination of symbols is not set on the effective prize line, and no prize is awarded, unless the stop buttons 16 to 18 are operated at predetermined timings. This is because the draw control is limited by the four symbols so that the expected combination of prize symbols cannot be achieved in case no prize symbol is present in the four symbols.

When the prize is not awarded, the answer of Step 110 is "NO", and the operation returns to the initial Step 101. In the case of a replay game (or play again) as a result of the determination of prize, the processing returns to that of waiting for the operation of the start lever 15 of Step 102 (at Step 111). In the case of a prize except that for a replay, the hopper drive circuit 41 is controlled by the CPU 31, and a predetermined number of coins are paid out to the coin tray 20 by the hopper 38(at Step 112 of FIG. 36).

For example, two coins are paid out in the case of the small hit prize of "2 cherries", and four coins are paid out in the case of the small hit prize of "4 cherries". Furthermore, six coins are paid out in the case of the small hit prize of "bell", and eight coins are paid out in the case of the small hit prize of "watermelon". In the case of the big hit prize of "BB" or "RB", furthermore, fifteen coins are paid out.

Next, it is determined (at Step 113) whether or not the BB game is caused. When this BB game is caused, it is carried out (at Step 114). When the BB game is not caused, it is then determined (at Step 115) whether or not the RB game is caused. When the RB game is caused, it is carried out (at Step 116). After this, the operations thus far described are repeated to carry out the game of the slot machine.

According to this embodiment, the prize mode determined by the inner lottery is informed to the player through a series of flow of the slot machine game. Specifically, the player is informed of the prize mode by the combination of the kinds of the game starting sounds which are generated by the sound emitting means when the rotation of the individual reels 3 to 5 is stated, the kinds of the display modes (or the reel lamp extinguishing patterns) of the individual back lamps 57*a* to 57*c* which are successively staged by the connection staging means in connection with the stop of the individual reels 3 to 5, and the kinds of the display modes (or the reel lamp flashing patterns) of the individual back lamps 57*a* to 57*c* which are staged by the stop staging means when all the individual reels 3 to 5 are stopped.

For example, in the aforementioned case in which the watermelon is hit in the inner hit of the BB and in which the combination of the staging modes of the column of the lottery value 32 of the demonstration lottery table No. 16 is selected, the player listens to the game starting sound 1 at the time of operating the start lever 15, recognizes that the individual back lamps 57*a* to 57*c* are extinguished, extinguished and extinguished in this order by the visual sense in the midst of the operation to stop the first reel 3, the second reel 4 and the third reel 5, and recognizes that the individual back lamps 57*a* to 57*c* stop the display in the mode of the reel lamp flashing pattern 3 after all the reels 3 to 5 were stopped by the visual sense.

In this embodiment, the prize mode becomes clear as the game advances, as described hereinbefore. Specifically, the rotation of the individual reels 3 to 5 is started by operating the start lever 15 and is successively stopped for each column by operating the individual stop buttons 16 to 18. As the rotation of all the reels 3 to 5 is stopped, the player is informed of the kinds of the hit flags which are determined by the inner lottery. Although conventionally, therefore, the result of the lottery determined by the random number lottery inside of the machine has not been known at all in respect of the prize mode other than the big hit prize until the patterns are actually stopped and displayed at the individual windows, according to the embodiment, so that the player can predict the prize mode to some degree.

According to the embodiment, furthermore, when the inner hit of the BB or RB is informed at the probability of 100%, the player is informed of the fact that the inner hit of the BB or RB is caused by the light display of the notification lamp 25. When the inner hit of the BB or RB is informed at a probability smaller than 100%, that is, in the case in which even when the inner hit of the BB or RB is caused by the inner lottery, the inner hit is not necessarily informed, the result of the inner lottery is not notified by the light display of the notification lamp 25. Even when the result of the inner lottery of causing the inner hit of the BB or RB is not displayed at the notification lamp 25, therefore, the player can be informed of a result of the inner lottery of causing the inner hit of the BB or RB by the pattern of the staging mode combination which is informed through a series of flow of the game.

Unlike the conventional game machine in which a result of the inner lottery for causing a big hit prize is mechanically informed to the player, therefore, according to the game machine of the embodiment, the player can feed the pleasure of searching the result of the inner lottery as in searching, for example, the "reach spot".

Although in the explanation of the aforementioned embodiment, an explanation has been given of the case in which the notification lamp 25 constituting the notification means is installed on the front panel of the machine exclusive for the notification, furthermore, the establishment of a flag of a specified prize mode may be notified by using an existing display device. For example, the establishment of a specified flag may be notified by emitting a special sound from the speaker 39. Alternatively, the establishment of a specified flag may be notified by vibrating the individual reels 3 to 5.

Furthermore, the notification means may be realized by information means for informing the prediction of establishment of flags of the individual prize modes. For example, the establishment of a specified flag may be notified by displaying a mode of flashing the individual back lamps 57*a* to 57*c* of the individual reels 3 to 5 by a specified information mode after the end of the reel lamp flashing display which is effected by the stop staging means at the stop time of the individual reels.

Furthermore, the liquid crystal display unit 24 may be used as the information means for informing the prediction of establishing flags of the individual prize modes and may also be used as the notification means. That is, instead of informing a prediction by a staging combination of a display mode of the reel back lamps or the like, the prediction may be informed by making a character or the like enter the liquid crystal display unit 24 and by combining changes in the display of the character, or the prediction may be informed by combining the changes in the display of a background image. Furthermore, the notification by the notification means may be carried out by displaying the liquid crystal display unit 24 in a specified mode different from that of informing the prediction.

Although an explanation has been given of the case in which the game machine according to the invention is applied to a slot machine in the embodiment thus far described, furthermore, the invention should not be limited thereto but can be applied, for example, to a pinball game machine such as a pachinko machine or amusement machines having variable display devices. Some game machine is not provided with buttons for stopping the variable display so that the individual variable display portions are successively stopped automatically for each variable display column. In this case, too, effects similar to those of the foregoing embodiments can be achieved if the prize mode informing means is operated at the timing in which the individual variable display columns are automatically stopped.

When the invention is applied to the pachinko machine, the flow of the game such as the operation of the start lever, sampling of a random number for determining a prize mode and starting to rotate the reels in the slot machine of the foregoing embodiment, is replaced by the flow of the game such as the insertion of pachinko balls into a specific prize slot, sampling of a random number for determining a prize mode and starting to rotate the slot machine reels integrated into the pachinko machine. Furthermore, the operation of paying out coins, which is carried out when the patterns of the reels are stopped and displayed to constitute a specific mode in the slot machines of the foregoing individual embodiments, is replaced by rewarding a special prize in the pachinko game as in providing a large number of balls to the player by opening a variable prize device of an attacker or tulip in the pachinko machine.

Although the present invention has been explained in reference to the embodiments, it is apparent for those skilled in the art that many changes and modifications can be made without departing from the spirit and scope of the invention, as clear from the following claims.

What is claimed is:

1. A game machine having a prize mode, the prize mode enabling a player of the game machine to reasonably predict the value of a prize during playing of the game, the game machine comprising:

prize mode determining means which determines a prize mode of a game with reference to a probability table comprising data for classifying a drawing random number into an individual prize mode, and which erects a hit flag of a prize mode to which the drawing random number belongs;

a variable display device for displaying various patterns variably in a plurality of columns and for displaying a combination of the patterns statically in said individual columns in accordance with the prize mode which is determined by said prize mode determining means;

information means for informing a player of an information corresponding to a kind of a hit flag of a prize mode determined by a random number lottery with reference to an informing determination table, which is different from said probability table, for determining the prize mode to be informed, at a predetermined probability determined by the random number lottery with reference to the informing determination table, enabling a player to estimate the value of the predetermined prize mode; and notification means for notifying the player in conjunction with said information means, that the hit flag of a specific prize mode was erected by said prize mode determining means in a predetermined informing mode on condition that said information is a predetermined one corresponding to the specific prize mode.

2. A game machine according to claim 1:

wherein said notification means notifies the player of the hit flag of the specific prize mode being erected by display of a display device.

3. A game machine according to claim 2:

wherein said notification means continues to notify the player through said display device until the end of the game of the specific prize mode.

4. A game machine according to claim 1, wherein said notification means is realized by the predetermined information mode by said information means.

5. A game machine according to claim 1, wherein said prize mode determining means comprises: random number generating means for generating a random number within a predetermined range; random number sampling means for sampling an arbitrary one from the random numbers which are generated by said random number generating means; and random number classifying means for classifying the random number, which is sampled by said random number sampling means, into individual prize modes.

6. A game machine according to claim 5, wherein said specific prize mode is a big or medium hit inner prize mode.

7. A game machine according to claim 1:

further comprising variable display starting means for starting a variable display of said variable display device; and variable display stopping means for stopping said variable display for the individual columns;

wherein said information means informs the player of said information corresponding to the kind of the hit flag of the prize mode at the predetermined probability, by said variable display stopping means; and wherein said notification means notifies the player of the hit flag of the specific prize mode being erected in the predetermined information mode on condition that said information is the predetermined one corresponding to the specific prize mode and is to be informed to the player at a probability of 100%.

8. A game machine according to claim 7, wherein said information means comprises: sound emitting means for generating one of a plurality of effective sounds when said variable display is started by said variable display starting means; connective staging means for staging a variable display of at least one column in one of a plurality of display modes in connection with the stop of said variable display of at least one column by said variable display stopping means; stop staging means for staging the display of said variable display device in one of a plurality of display modes when all of said variable displays of the individual columns are stopped; and information mode selecting means for selecting a combination of the kinds of the effective sounds, which are generated by said sound emitting means, the kinds of connective display modes, which are staged by said connective staging means, and the kinds of stop staging modes, which are staged by said stop staging means, in accordance with the prize mode which is determined by said information means.

9. A game machine according to claim 8, wherein said connective staging means stages said variable displays of the individual columns sequentially in one of said plurality of display modes in connection with the stop of said variable displays of the individual columns by said variable display stopping means.

10. A game machine according to claim 8:

wherein said information mode selecting means selects a demonstration lottery table which comprises the informing determination table used by said information means for determining the prize mode to be informed in accordance with a game state and a prize mode determined by said prize mode determining means with reference to a demonstration lottery table selecting table comprising data for classifying a combination of the game state and the prize mode into individual demonstration lottery tables, and further;

wherein said information mode selecting means selects a staging mode combination in accordance with a drawing random number with reference to the selected demonstration lottery table.

11. A game machine according to claim 8, wherein said variable display stopping means comprises a plurality of stop buttons provided to correspond to said individual variable display columns, and wherein said connective staging means stages said variable displays of the individual columns in connection with the operations of said stop buttons.

12. A game machine according to claim 11:

wherein said variable display device comprises: a plurality of rotary reels having various patterns illustrated on their outer circumferences; and a plurality of light sources provided for the individual rotary reels for illuminating the patterns from the rear, wherein said patterns are stopped and displayed by said individual rotary reels;

wherein said connective staging means stages said displays of the individual columns by controlling the lighting of said individual light sources for the individual rotary reels in connection with the individual operations of said individual stop buttons, and wherein said stop staging means stages the display of said variable display device by controlling the lighting of said individual light sources of the rotary reels when all said variable displays of the individual columns are stopped.

13. A game machine according to claim 8, wherein said variable display stopping means stops said variable displays automatically for the individual columns, and wherein said connective staging means stages said displays of the individual columns in connection with the automatic stops of said variable displays for the individual columns by said variable display stopping means.

14. A game machine according to claim 13:

wherein said variable display device comprises: a plurality of rotary reels having various patterns illustrated on their outer circumstances; and a plurality of light sources provided for the individual rotary reels for illuminating the patterns from the rear, wherein said patterns are stopped and displayed by said individual rotary reels;

wherein said connective staging means stages said displays of the individual columns by controlling the lighting of said individual light sources for the individual rotary reels in connection with the automatic stops of said variable displays for the individual columns by said variable display stopping means, and wherein said stop staging means stages the display of said variable display device by controlling the lighting of said individual light sources of the rotary reels when all said variable displays of the individual columns are automatically stopped.

15. A game machine according to claim 12 or 14, wherein said notification means notifies the information to the player by vibrating said rotary reels.

16. A game machine according to claim 1, wherein said game machine is a slot machine or an elastic ball game machine.

17. A game machine according to claim 1:

further comprising variable display stopping means for stopping said variable display for the individual columns;

wherein said variable display stopping means comprises:

a plurality of stop buttons provided with said individual variable display columns, and wherein;

said variable display stopping means stops said variable display for the individual columns corresponding to an operation timing of a stop button;

and further wherein said variable display stopping means controls the display of the combination of the patterns statically on an effective prize line of said variable display device in accordance with the prize mode, such that when the stop button is not operated at the operation timing, the combination of the patterns corresponding to the hit flag is not displayed on the effective prize line.

* * * * *